US008360567B2

(12) United States Patent
Ito

(10) Patent No.: US 8,360,567 B2

(45) Date of Patent: Jan. 29, 2013

(54) LIQUID EJECTING APPARATUS HAVING A DECOMPRESSION UNIT

(75) Inventor: Hiroyuki Ito, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 524 days.

(21) Appl. No.: 12/542,881

(22) Filed: Aug. 18, 2009

(65) Prior Publication Data

US 2010/0045757 A1 Feb. 25, 2010

(30) Foreign Application Priority Data

Aug. 19, 2008 (JP) ................................ 2008-210836
Sep. 2, 2008 (JP) ................................ 2008-224885

(51) Int. Cl.

*B41J 2/19* (2006.01)
*B41J 2/17* (2006.01)
*B01D 59/12* (2006.01)

(52) U.S. Cl. .................. 347/92; 347/84; 347/94; 95/46

(58) Field of Classification Search .................... 347/92, 347/94

See application file for complete search history.

(56) References Cited

U.S. PATENT DOCUMENTS 4,673,955 A * 6/1987 Ameyama et al. .............. 347/92
5,546,109 A * 8/1996 Nakano .......................... 347/92
5,659,346 A * 8/1997 Moynihan et al. .............. 347/92
5,808,643 A * 9/1998 Tracy et al. ..................... 347/92
7,473,302 B2 1/2009 Ueda
8,087,762 B2 1/2012 Takemura et al.
2007/0052775 A1 3/2007 Jung
2008/0151026 A1* 6/2008 Kobayashi ...................... 347/92
2008/0225090 A1* 9/2008 Kobayashi ...................... 347/85
2008/0239028 A1* 10/2008 Umeda ........................... 347/85
2008/0309706 A1* 12/2008 Yokouchi et al. ............... 347/30
2009/0147064 A1* 6/2009 Ito et al. .......................... 347/92

FOREIGN PATENT DOCUMENTS

JP 63-145039 6/1988
JP 01-502504 8/1989
JP 2005-178240 7/2005
JP 2005-288767 10/2005
JP 2006-075683 3/2006
JP 2006-095878 4/2006
JP 2006095878 A * 4/2006
JP 2006-206190 8/2006
JP 2007130821 A * 5/2007
JP 2007-137032 6/2007
JP 2008-062396 3/2008
JP 2008-073944 4/2008
JP 2008-520472 6/2008
JP 2008-155617 7/2008
WO 88-08515 11/1988
WO 2006-055490 5/2006

* cited by examiner

*Primary Examiner* — Shelby Fidler
(74) *Attorney, Agent, or Firm* — Workman Nydegger

(57) ABSTRACT

There is provided a liquid ejecting apparatus that is used for ejecting a liquid. The liquid ejecting apparatus includes a head unit that ejects the liquid, a liquid supplying path that is used for leading the liquid to the head unit, a defoaming chamber that is disposed in the liquid supplying path and is used for eliminating air bubbles inside the liquid, a broaden chamber that is disposed in the liquid supplying path and can collect the liquid due to having a cross-section area larger than that of the liquid supplying path, and a decompression unit that is used for decompressing the defoaming chamber and the broaden chamber.

7 Claims, 16 Drawing Sheets

FOURTH EMBODIMENT

< AT THE TIME OF INK EJECTION >

< AFTER INFLOW OF INK >

SIXTH EMBODIMENT

SEVENTH EMBODIMENT

EIGHTH EMBODIMENT

EIGHTH EMBODIMENT

NINTH EMBODIMENT

TENTH EMBODIMENT

LIQUID EJECTING APPARATUS HAVING A DECOMPRESSION UNIT

CROSS REFERENCES TO RELATED APPLICATIONS

The present invention contains subject matter related to Japanese Patent Application No. 2008-210836 filed in the Japanese Patent Office on Aug. 19, 2008 and Japanese Patent Application No. 2008-224885 filed in the Japanese Patent Office on Sep. 2, 2008, the entire contents of which are incorporated herein by reference.

BACKGROUND

1. Technical Field

The present invention relates to technology for eliminating air bubbles from a liquid located in a liquid supplying path inside a liquid ejecting apparatus or for suppressing generation of the air bubbles.

2. Related Art

In ink jet printers, there are cases where defective printing such as missing dots occurs when air bubbles are generated in ink located in an ink supplying path that is from an ink supply unit such as an ink cartridge to a record head. Thus, printers capable of eliminating the air bubbles (defoaming) from ink have been proposed (see JP-A-2006-75683).

In addition, in the ink jet printers, there are cases where defective printing such as missing dots occurs when the air bubbles are generated in the ink located in an ink supplying path that is from the ink supply unit such as an ink cartridge to a record head. Accordingly, to eliminate the air bubbles (defoaming) from the ink is needed. As a mechanism for performing such defoaming, a mechanism has been proposed in which a chamber (defoaming chamber) for capturing air bubbles by temporarily collecting the ink and a decompression chamber are located to be adjacent to each other through a partition wall having gas permeability and the air bubbles captured in the defoaming chamber are eliminated by adjusting the pressure of the decompression chamber to be lower than that of the defoaming chamber (see, JP-A-2006-95878).

In the ink jet printers, there are cases where a separate chamber for collecting ink is disposed in the ink supplying path in addition to the defoaming chamber used for a defoaming operation. As such a chamber, for example, there is a damper chamber that adjusts the internal pressure of the record head. There are cases where a flexible member is used in the damper chamber, and accordingly, there is a problem that air bubbles can be easily generated and grow. In addition, even in a configuration in which a sub tank is arranged in addition to a main tank used for storing ink, there are cases where air bubbles are generated in the sub tank.

However, sufficient consideration for a defoaming operation that is performed in a space (a broaden chamber) which has a cross-section area larger than that of the ink supplying path, such as the damper chamber or the sub tank has not been made. In addition, such problems may occur not only in the ink jet printers but also in a liquid ejecting apparatus that ejects any type of liquid such as lubricant or a resin liquid.

SUMMARY

An advantage of some aspects of the invention is that it provides technology capable of eliminating the air bubbles contained in the liquid or suppressing the growth of the air bubbles in a liquid ejecting apparatus having a defoaming chamber and a broaden chamber.

In a defoaming mechanism, the air bubbles can be easily eliminated as the partition wall disposed between the defoaming chamber and the decompression chamber becomes thinner, whereby the defoaming capability is improved. However, there is a problem that sufficient strength cannot be acquired to endure repeated use for decompression and compression in a case where the partition wall is formed to be thin. In addition, such a problem may occur not only in the ink jet printers but also in a liquid ejecting apparatus that ejects any type of the liquid such as lubricant or a resin liquid.

In addition, another advantage of some aspects of the invention is that it provides technology capable of improving the defoaming capability while improving the strength of the defoaming mechanism.

The invention may be implemented in the following forms or applied examples.

APPLIED EXAMPLE 1

According to a first aspect of the invention, there is provided a liquid ejecting apparatus that is used for ejecting a liquid. The liquid ejecting apparatus includes: a head unit that ejects the liquid; a liquid supplying path that is used for leading the liquid to the head unit; a defoaming chamber that is disposed in the liquid supplying path and is used for eliminating air bubbles inside the liquid; a broaden chamber that is disposed in the liquid supplying path and can collect the liquid due to having a cross-section area larger than that of the liquid supplying path; and a decompression unit that is used for decompressing the defoaming chamber and the broaden chamber.

According to the above-described liquid ejecting apparatus, the defoaming chamber and the broaden chamber are decompressed by the decompression unit. Accordingly, elimination of air bubbles (gas) generated in the liquid collected in the broaden chamber in addition to the defoaming chamber or suppression of the growth of the air bubbles can be performed. In addition, since the decompression unit decompresses the defoaming chamber and the broaden chamber, the manufacturing cost of the liquid ejecting apparatus can be suppressed, and miniaturization of the liquid ejecting apparatus can be achieved, compared to a configuration in which function units for decompressing the defoaming chamber and for decompressing the broaden chamber are independently disposed.

APPLIED EXAMPLE 2

In the liquid ejecting apparatus described in Applied Example 1, the decompression unit includes a decompression chamber and a pressure adjusting section that adjusts the pressure inside the decompression chamber, where the decompression chamber is brought into contact with the defoaming chamber and the broaden chamber, and gas can permeate through the wall of the decompression chamber that is brought into contact with the defoaming chamber, the wall of the decompression chamber that is brought into contact with the broaden chamber, the wall of the defoaming chamber that is brought into contact with the decompression chamber, and the wall of the broaden chamber that is brought into contact with the decompression chamber.

In such a case, the air bubbles (gas) inside the liquid which are collected in the defoaming chamber and the broaden chamber can be discharged to the decompression chamber through the wall that is brought into contact with the decompression chamber. Accordingly, the air bubbles contained in the defoaming chamber and the broaden chamber can be eliminated or the growth of the air bubbles can be suppressed.

APPLIED EXAMPLE 3

In the liquid ejecting apparatus described in Applied Example 2, the wall of the decompression chamber that is brought into contact with the defoaming chamber and the wall of the defoaming chamber that is brought into contact with the decompression chamber are integrally formed, and the wall of the decompression chamber that is brought into contact with the broaden chamber and the wall of the broaden chamber that is brought into contact with the decompression chamber are integrally formed.

In such a case, the number of components is decreased, compared to the case where the wall of the decompression chamber that is brought into contact with the defoaming chamber and the wall of the defoaming chamber that is brought into contact with the decompression chamber are separated formed, or the case where the wall of the decompression chamber that is brought into contact with the broaden chamber and the wall of the broaden chamber that is brought into contact with the decompression chamber are separately formed. As a result, the manufacturing cost of the liquid ejecting apparatus can be suppressed.

APPLIED EXAMPLE 4

In the liquid ejecting apparatus described in Applied Example 2, the defoaming chamber is disposed on the lower side of the decompression chamber, the broaden chamber is disposed on the upper side of the decompression chamber, and the defoaming chamber, the decompression chamber, and the broaden chamber are disposed in approximately one row in the vertical direction.

In such a case, the defoaming chamber, the decompression chamber, and the broaden chamber can be disposed in approximately one row. Thus, even when the sizes of faces of the defoaming chamber and the compression chamber that are brought into contact with the decompression chamber are relatively large, an excessive increase in the total size of the liquid ejecting apparatus can be suppressed.

APPLIED EXAMPLE 5

In the liquid ejecting apparatus described in Applied Example 4, the defoaming chamber has an ejection opening for the liquid on a bottom face, and the decompression chamber is disposed on the upper side of the ejection opening in the vertical direction.

In such a case, the decompression chamber is located on the upper side of the ejection opening in the vertical direction in which the air bubbles can be easily generated in the defoaming chamber. Accordingly, the defoaming operation for the defoaming chamber can be effectively performed.

APPLIED EXAMPLE 6

In the liquid ejecting apparatus described in Applied Example 2, the broaden chamber includes a flexible portion having flexibility, and is brought into contact with the decompression chamber in a portion other than the flexible portion.

In such a case, even when air bubbles can be easily generated due to inclusion of the flexible portion in the broaden chamber, the air bubbles (gas) can be discharged to the decompression chamber. Accordingly, the air bubbles (gas) in the liquid that are collected in the broaden chamber can be eliminated, or the growth of the air bubbles can be suppressed.

APPLIED EXAMPLE 7

In the liquid ejecting apparatus described in Applied Example 6, a valve chamber that is linked with a liquid inflow opening of the broaden chamber and a valve device that is disposed inside the valve chamber and adjacent the broaden chamber are further included. In addition, the flexible portion is elastically deformed to the inside of the broaden chamber when the pressure inside the broaden chamber is lower than the external pressure of the broaden chamber, and the valve device is in a valve opening state in which the liquid flows into the broaden chamber from the liquid inflow opening by using suppressed pressure during the elastic deformation of the flexible portion.

In such a case, when the pressure inside the broaden chamber is lower than the external pressure of the broaden chamber as the pressure inside the broaden chamber is decreased by ejecting ink from the head unit, the valve device is in the valve opening state, and accordingly, the liquid can be supplied to the broaden chamber.

APPLIED EXAMPLE 8

According to a second aspect of the invention, there is provided a defoaming mechanism that is used for eliminating air bubbles from the liquid flowing through the inside of a liquid ejecting apparatus. The defoaming mechanism includes a defoaming chamber that has a first wall having gas permeability and is used for capturing air bubbles contained in the liquid and a decompression chamber that has a second wall having gas permeability and is brought into contact with the defoaming chamber through the second wall and the first wall. At least one of the first wall and the second wall has a reinforced shape.

According to the above-described defoaming mechanism, at least one of the first wall of the defoaming chamber that is brought into contact with the decompression chamber and the second wall of the decompression chamber that is brought into contact with the defoaming chamber has the reinforced shape. Accordingly, the strength of the defoaming mechanism can be improved, and the defoaming capability can be improved by having the first wall and the second wall can be formed so as to be thin.

APPLIED EXAMPLE 9

In the defoaming mechanism described in Applied Example 8, the reinforced shape is any one of a rib shape having the cross-section in which a thick portion and a thin portion are alternately disposed, a waveform shape having a waveform cross-section of which the plane has a streaky shape, and a dot shape in which thick portions or thin portions are scattered.

In such a case, the strength between the defoaming chamber and the decompression chamber can be improved, and a thickness of at least a part between the defoaming chamber and the decompression chamber can be decreased. In addition, the surface area of the first wall or the second wall can be increased, and thereby the defoaming capability can be improved.

APPLIED EXAMPLE 10

In the defoaming mechanism described in Applied Example 9, the first wall and the second wall are formed of a single member.

In such a case, the number of components of the defoaming mechanism can be decreased, and accordingly, the manufacturing cost of the defoaming mechanism can be suppressed.

APPLIED EXAMPLE 11

In the defoaming mechanism described in Applied Example 9, the first wall has the reinforced shape, and the reinforced shape is either the above-described rib shape or the above-described waveform shape. In addition, the longitudinal direction of the above-described rib shape or the streaky-shape direction of the above-described waveform shape and the direction of inflow of the liquid in the defoaming chamber intersect each other.

In such a case, the contact area of the first wall with the liquid can be increased, and accordingly, more air bubbles can be captured in the first wall. In addition, even when the liquid flows into the defoaming chamber, the state in which the air bubbles are captured in the first wall can be maintained. Accordingly, the flow of the air bubbles on the downstream side of the defoaming chamber can be suppressed.

APPLIED EXAMPLE 12

In the defoaming mechanism described in Applied Example 10, the planar shape of the single member is a rectangle, and the reinforced shape is either the above-described rib shape or the above-described waveform shape. In addition, the longitudinal direction of the above-described rib shape or the streaky-shape direction of the above-described waveform shape is parallel to the direction facing a side of the rectangle that is faced by a side having an inflow position for a molding material during the molding of the single member.

In such a case, the direction in which the molding material flows in the portion of the molding pattern corresponding to the first wall and the second wall can be positioned to be parallel to the longitudinal direction of the rib shape or the streaky-shape direction of the waveform shape. Accordingly, the circulation of the molding material inside the molding pattern can be improved. Therefore, holes opening in the single member without being filled with the molding material can be suppressed.

APPLIED EXAMPLE 13

According to a third aspect of the invention, there is provided a defoaming mechanism that is used for removing air bubbles form a liquid that flows through the inside of a liquid ejecting apparatus. The defoaming mechanism includes a defoaming unit that is used for capturing air bubbles in the liquid and a decompression chamber that is disposed so as to surround the defoaming unit. In addition, the defoaming unit has a wall having gas permeability, and the wall has a reinforced shape.

According to the above-described defoaming mechanism, the wall of the defoaming unit has a reinforced shape. Accordingly, the strength of the defoaming mechanism can be improved, and the defoaming capability can be improved by having the wall of the defoaming chamber can be formed so as to be thin.

APPLIED EXAMPLE 14

According to a fourth aspect of the invention, there is provided a defoaming mechanism that is used for removing air bubbles from a liquid that flows through the inside of a liquid ejecting apparatus. The defoaming mechanism includes a defoaming chamber that is used for capturing air bubbles contained in the liquid and a decompression chamber that is disposed inside the defoaming chamber. In addition, the decompression unit has a wall having gas permeability, and the wall has a reinforced shape.

According to the above-described defoaming mechanism, the wall of the decompression chamber has the reinforced shape. Accordingly, the strength of the defoaming mechanism can be improved, and the defoaming capability can be improved by forming the wall of the decompression chamber so as to be thin.

APPLIED EXAMPLE 15

According to a fifth aspect of the invention, there is provided a liquid ejecting apparatus that includes the defoaming mechanism described in Applied Example 8.

According to the above-described liquid ejecting apparatus, a great amount of the air bubbles can be eliminated from the liquid flowing through the inside of the liquid ejecting apparatus, and the strength of the defoaming mechanism can be improved. Therefore, the frequency of break downs in the liquid ejecting apparatus can be suppressed so as to be low.

APPLIED EXAMPLE 16

According to a sixth aspect of the invention, there is provided a method of manufacturing a defoaming mechanism that is used for eliminating air bubbles from a liquid flowing through the inside of a liquid ejecting apparatus. The method includes: forming a member of a defoaming chamber that has a first wall having gas permeability and is used for capturing the air bubbles contained in the liquid; forming a member of a decompression chamber that has a second wall having gas permeability; and bonding the member of the defoaming chamber and the member of the decompression chamber to allow the defoaming chamber and the decompression chamber to be brought into contact with each other through the first wall and the second wall. At least any one of the forming of the member of the defoaming chamber and the forming of the member of the decompression member includes forming the first wall or the second wall in a rib shape having the cross section in which a thick portion and a thin portion are alternately disposed or a waveform shape having the waveform-shaped cross-section and the streaky-shaped waveform in the plan view. In addition, the forming of the first wall or the second wall includes molding the member of the defoaming chamber or the member of the decompression chamber by having a molding material flow along the longitudinal direction of the above-described rib shape or the streaky-shape direction of the above-described waveform shape in a molding pattern for the member of the defoaming chamber or a molding pattern for the member of the decompression chamber.

According to the above-described method of manufacturing a defoaming mechanism, the molding material flows in the molding pattern for the member of the defoaming chamber or the molding pattern for the decompression chamber along the longitudinal direction of the rib shape or the streaky-shape direction of the waveform. Accordingly, the flowing of the molding material inside the molding pattern can be improved. Therefore, it can be suppressed that a hole is opened on the first wall or the second wall without being filled with the molding material.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

A1. Configuration of Apparatus

Figure 1:
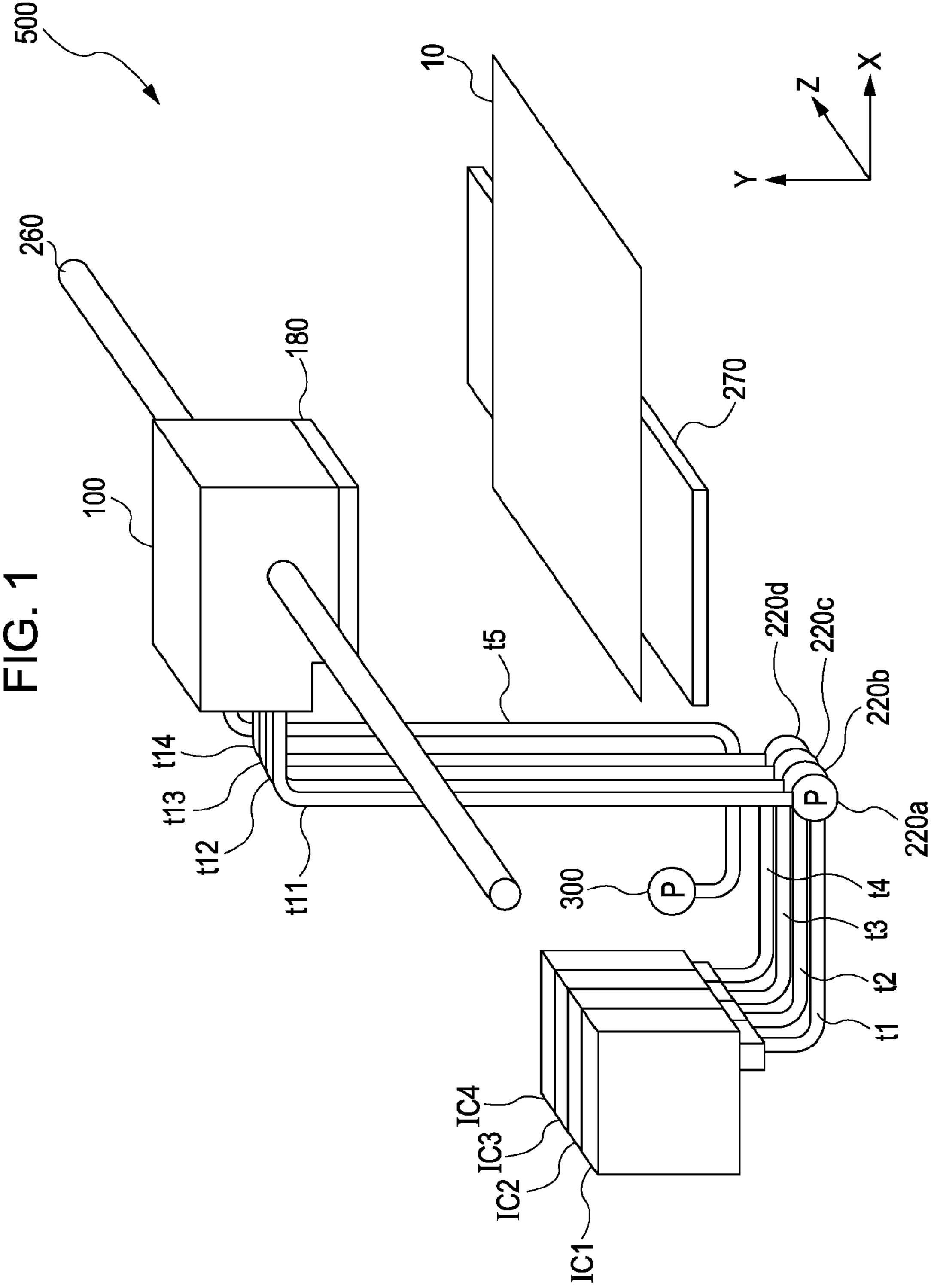
FIG. 1 is an explanatory diagram showing a schematic configuration of a printer as a liquid ejecting apparatus according to a first embodiment of the invention.

FIG. 1 is an explanatory diagram showing a schematic configuration of a printer 500 used as a liquid ejecting apparatus according to a first embodiment of the invention. The printer 500 according to the first embodiment is an ink jet printer that can eject four colors (black, cyan, magenta, and yellow) of ink. This printer 500 includes an ink cartridge IC1 for black ink, an ink cartridge IC2 for cyan ink, an ink cartridge IC3 for magenta ink, an ink cartridge IC4 for yellow ink, a carriage 100, a record head 180, a guide rod 260, a platen 270, four ink supply pumps 220*a*, 220*b*, 220*c*, and 220*d*, and a decompression pump 300.

The printer 500 is a so-called off-carriage-type printer in which four ink cartridges IC1 to IC4 are mounted to the printer main body side. The ink cartridge IC1 is connected to the carriage 100 through a tube t1, the ink supply pump 220*a*, and a tube t11. Similarly, the ink cartridges IC2, IC3, IC4 are connected to the carriage 100 through a tube t2, the ink supply pump 220*b*, and a tube 12, through a tube t3, the ink supply pump 220*c*, and a tube t13, and through a tube t4, the ink supply pump 220*d*, and a tube 14, respectively. The decompression pump 300 is connected to the carriage 100 through a tube t5. In addition, the ink cartridges IC1 to IC4 are mounted on a main frame (not shown) of the printer 500 by a cartridge holder not shown in the figure.

The ink supply pump 220*a* supplies black ink to the carriage 100 by sucking and ejecting the black ink stored inside the ink cartridge IC1. In other words, the tube t1, the ink supply pump 220*a*, and the tube t11 constitute a part of a black ink supplying path. Similarly, the ink supply pump 220*b* sucks cyan ink stored inside the ink cartridge IC2 and supplies the cyan ink to the carriage 100, and the ink supply pump 220*c* sucks magenta ink stored inside the ink cartridge IC3 and supplies the magenta ink to the carriage 100. In addition, the ink supply pump 220*d* sucks yellow ink stored inside the ink cartridge IC4 and supplies the yellow ink to the carriage 100. The decompression pump 300 is commonly used for all the colors (black, cyan, magenta, and yellow). The operation of the decompression pump 300 will be described later.

The guide rod 260 is disposed on the upper side (+Y direction) of the platen 270 along the longitudinal direction (a Z axis) of the platen 270. The carriage 100 is supported so as to be movable in the longitudinal direction of the platen 270 along the guide rod 260. In addition, the carriage 100 is driven through a timing belt (not shown) by a carriage motor (not shown). The record head 180 is disposed on the bottom face of the carriage 100. In addition, the record head 180 ejects ink droplets in the −Y direction from a plurality of nozzles (not shown) together with the reciprocating motion of the carriage 100 in the longitudinal direction. At this moment, a recording sheet 10 is sent on the platen 270 in the +X direction by a paper feeding mechanism not shown in the figure, and an image or the like is formed on the recording sheet 10.

Figure 2:
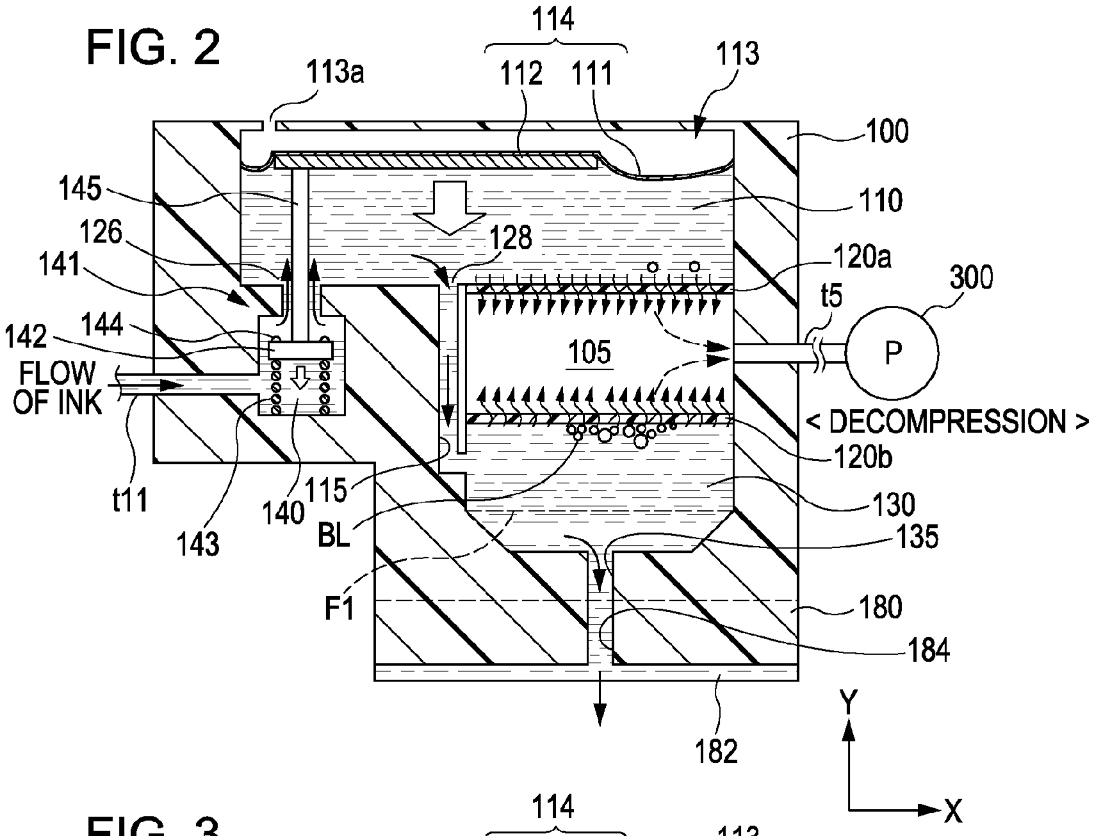
FIG. 2 is a cross-sectional view showing the internal structure of a carriage and a record head shown in FIG. 1.

FIG. 2 is a cross-sectional view showing the internal structure of the carriage 100 and the record head 180 shown in FIG. 1. In addition, the carriage 100 includes an air chamber 113, a compression chamber 110, a valve chamber 140, a defoaming chamber 130, and a decompression chamber 105.

The air chamber 113 is linked with the air outside through an air linkage hole 113*a*. The compression chamber 110 is a hollow chamber. The compression chamber 110 adjusts the internal pressure of the ink supply path inside the carriage 100 by temporarily collecting black ink. The compression chamber 110 is positioned adjacent to the air chamber 113 with a partition wall portion 114 as a ceiling portion interposed therebetween. The partition wall portion 114 is configured by a film 111 that is formed of a flexible member (for example, a synthetic resin, rubber, or the like) and a thin plate member 112 of a cantilever (not shown) that can be displaced with the film 111. In addition, the film 111 is thermally welded to the side wall of the compression chamber 110. The compression chamber 110 includes an ink inflow opening 126 and is linked with the valve chamber 140 through the ink inflow opening 126. In addition, the compression chamber 110 has an ink discharge opening 128 and is linked with the defoaming chamber 130 through an ink distribution tube 115 that extends from the ink discharge opening 128.

The valve chamber 140 is a hollow chamber and is linked with the tube 11 and the ink inflow opening 126. In addition, a valve device 141 is disposed inside the valve chamber 140 and adjacent the compression chamber 110. This valve device 141 is configured by a valve body 142, a pressure adjusting spring 143, a sealing member 144, and a support rod 145. The valve body 142 can be displaced between an opening position (the position shown in FIG. 2) in which the ink inflow opening 126 and the valve chamber 140 are linked with each other and a sealing position (to be described later) in which the ink inflow opening 126 and the valve chamber 140 are not linked with each other. In addition, the valve body 142 is pushed to the sealing position side by the pressure adjusting spring 143. The sealing member 144 seals the valve chamber 140 so as not to allow ink to flow from the valve chamber 140 to the compression chamber 110 in the case where the valve body 142 is disposed in the sealing position. The support rod 145 has one end bonded to the valve body 142 and the other end bonded to the thin plate member 112.

The defoaming chamber 130 is a hollow chamber. A filter F1 is included inside the defoaming chamber 130. The defoaming chamber 130 is linked with the ink distribution tube 115. The defoaming chamber 130 is used for temporarily storing the ink flowing in from the ink distribution tube 115 and eliminating gas inside the ink by performing a defoaming operation to be described later. The ink stored in the defoaming chamber 130 passes through the filter F1 and is discharged to an ink ejection tube 135. The filter F1 has the function of capturing (trapping) air bubbles in the ceiling portion of the defoaming chamber 130 by not allowing the air bubbles flowing inside the ink supplying path to easily pass through the ink supplying path, in addition to the function of eliminating impurities (dusts or the like) by filtering the ink. In addition, the ink ejection tube 135 is linked with the bottom face of the defoaming chamber 130. The ink ejection tube 135 is linked with an ink ejection tube 184 that is included in the record head 180. Then, the ink that has passed the ink ejection tubes 135 and 184 is ejected from the plurality of nozzles (not shown) that is disposed in a nozzle plate 182. In the example shown in FIG. 2, the air bubbles BL are trapped in a position located on the upper side of the ink ejection tube 135 in an approximately vertical direction. The reason is that, in such a case, air bubbles can be generated or grown easily during the ejection of the ink, and the air bubbles can be easily collected on the upper side of the ink ejection tube 135 in the vertical direction.

The decompression chamber 105 is a hollow chamber and is interposed between the defoaming chamber 130 and the compression chamber 110. In particular, the decompression chamber 105 is disposed on the lower side of the compression chamber 110 that is the upper side of the defoaming chamber 130. In addition, the defoaming chamber 130, the decompression chamber 105, and the compression chamber 110 are disposed in one row in the vertical direction. In the example shown in FIG. 2, the decompression chamber 105 is disposed on the upper side of the ink ejection tube 135 in an approximately vertical direction in which air bubbles can be easily generated (grown). The defoaming chamber 130, the decompression chamber 105, and the compression chamber 110 may be disposed so as not to be completely in one row in the vertical direction but to be slightly deviated from one another in the horizontal direction. The decompression chamber 105 is connected to the decompression pump 300 through the tube t5. The decompression chamber 105 can be decompressed by the decompression pump 300 so as to be in a negative-pressure state.

Here, the ceiling face of the decompression chamber 105 and the bottom face of the compression chamber 110 are integrally formed as a partition wall portion 120*a*. Similarly, the bottom face of the compression chamber 105 and the ceiling face of the defoaming chamber 130 are integrally formed as a partition wall portion 120*b*. Both these partition wall portions 120*a* and 120*b* are configured by members that have gas permeability. As the member having the gas permeability, for example, polyacetal, polypropylene, or polyphenylene ether may be used. Alternatively, instead of the partition wall portion 120*a* that is integrally formed, the ceiling face of the decompression chamber 105 and the bottom face of the compression chamber 110 may be formed as separate walls having gas permeability and be bonded together. Likewise, instead of the above-described partition wall portion 120*b*, the bottom face of the decompression chamber 105 and the ceiling face of the defoaming chamber 130 may be formed as separate walls having the gas permeability and be bonded together. In the printer 500 having the above-described configuration, an ink supplying path that is configured by the valve chamber 140, the compression chamber 110, the ink distribution tube 115, the defoaming chamber 130, and the ink ejection tube 135 is formed inside the carriage 100.

The above-described compression chamber 110 corresponds to a broaden chamber according to an embodiment of the invention. In addition, the decompression pump 300 and the decompression chamber 105 correspond to a decompression unit according to the embodiment of the invention, the decompression pump 300 corresponds to a pressure adjusting unit according to the embodiment of the invention, and the thin plate member 112 and the film 111 correspond to a flexible unit according to the embodiment of the invention.

A2. Ink Supplying Operation

When ink is ejected from a nozzle (not shown) that is disposed in the nozzle plate 182 (FIG. 2) and is consumed, the chamber pressure of the compression chamber 110 decreases due to a decrease in the amount of the ink. Then, the film 111 is bent to the inside of the compression chamber 110 due to a differential pressure between the decreased chamber pressure and the pressure (atmospheric pressure) of the air chamber 113, and the partition wall portion 114 is displaced to the lower direction (−Y direction). At this moment, when the valve body 142 is pressed down due to the support rod 145, and the valve body 142 is in the opening position by overcoming the pushing force of the pressure adjusting spring 143, the ink inflow opening 126 is opened. Accordingly, the ink flows into the compression chamber 110.

Figure 3:
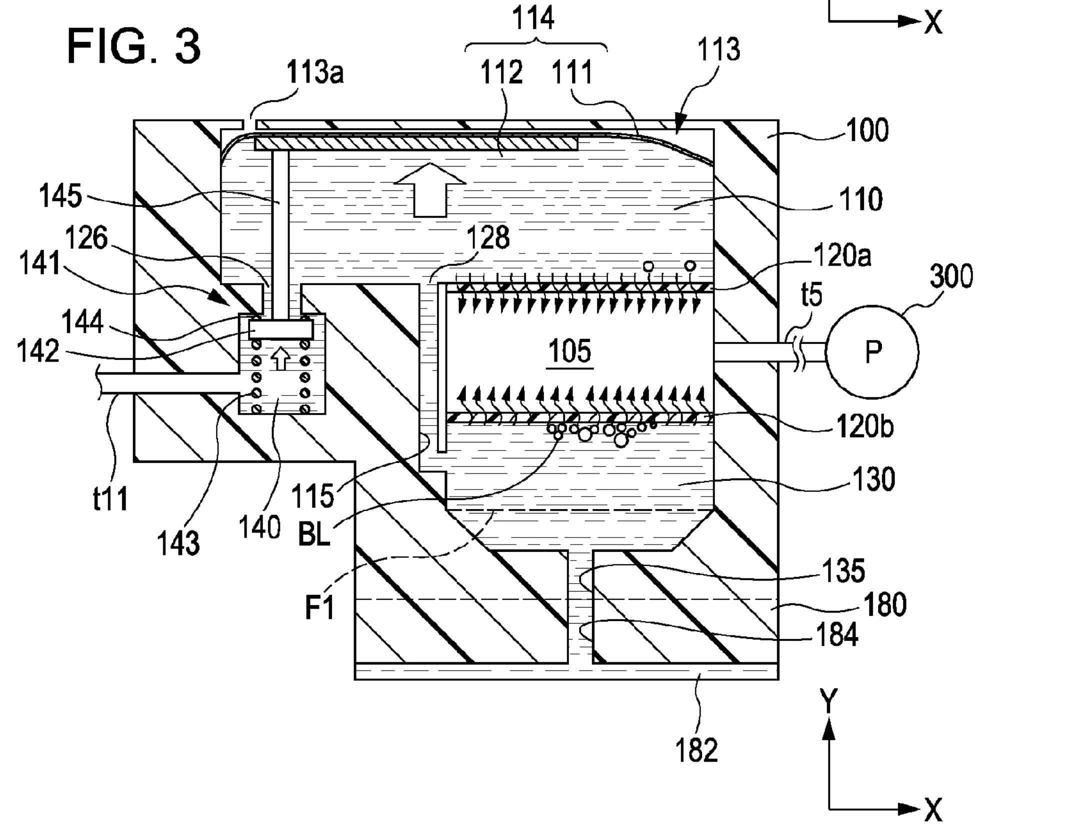
FIG. 3 is a cross-sectional view showing the state of the carriage and the record head after ink has flowed into a compression chamber from an opened ink inflow opening.

FIG. 3 is a cross-sectional view showing the state of the carriage 100 and the record head 180 after ink has flowed into the compression chamber 110 from the opened ink inflow opening 126. When the chamber pressure increases due to the flow of the ink into the compression chamber 110, the film 111 is bent to the outside of the compression chamber 110, and the partition wall portion 114 is displaced to the upper side. When the valve body 142 is moved to the enclosing position again, the flow of the ink into the compression chamber 110 is stopped, and the supply of the ink to the record head 180 is stopped. As described above, the printer 500 is configured such that the black ink supplied from the ink cartridge IC1 appropriately flows into the record head 180 in accordance with the opening and closing operations of the valve body 142 of the valve chamber 140 on the basis of the consumption of the ink.

A3. Defoaming Operation

After the printing operation is performed, the decompression pump 300 (FIG. 2) decompresses the decompression chamber 105. Since the decompression pump 300 is commonly used for the colors (black, cyan, magenta, and yellow), decompression chambers (not shown) for other colors (cyan, magenta, and yellow) are also decompressed, in addition to the decompression chamber 105 for black ink shown in FIG. 2. When the decompression chamber 105 is in a predetermined negative-pressure state, the operation of the decompression pump 300 stops, and a valve not shown in the figure closes. Accordingly, the decompression chamber 105 is maintained so as to be in a negative-pressure state. The air bubbles (gas) BL that have been trapped in the ceiling portion of the defoaming chamber 130 are transmitted through the partition wall portion 120*b* and flow into the decompression chamber 105. Accordingly, the air bubbles are slowly decreased. Since a part of the compression chamber 110 is the partition wall portion 114 having flexibility and has a complicated form, air bubbles can be easily generated or grown. Here, a part of the bottom portion of the compression chamber 110 is brought into contact with the decompression chamber 105 in the partition wall portion 120*a* having gas permeability. Accordingly, the air bubbles (gas) that are generated in the compression chamber 110 are discharged to the decompression chamber 105, or the growth of the air bubbles is suppressed.

As described above, in the printer 500, the defoaming chamber 130 and the compression chamber 110, in which the air bubbles can be easily generated or grow together, are disposed to be adjacent to the decompression chamber 10 through the partition wall portions 120*a* and 120*b* having gas permeability. Accordingly, the air bubbles located inside the defoaming chamber 130 and the compression chamber 110 can be eliminated or the growth of the air bubbles therein can be suppressed by the decompression operation. In addition, the decompression chamber 105 and the decompression pump 300, which are used for a defoaming operation, are commonly used by the compression chamber 110 and the defoaming chamber 130. Accordingly, the manufacturing cost of the printer 500 can be suppressed, and the carriage 100 can be miniaturized, compared to a configuration in which the decompression chamber and the decompression pump are disposed for each chamber. In addition, the defoaming chamber 130, the decompression chamber 105, and the compression chamber 110 are disposed in one row. Thus, even when the sizes of faces (the partition wall portions 120*a* and 120*b*) of the compression chamber 110 and the defoaming chamber 130 that are brought into contact with the decompression chamber 105 are configured to be relatively large, an excessive increase in the total size of the carriage 100 can be suppressed. In addition, since the decompression chamber 105 is located on the upper side of the ink ejection tube 135, in which the air bubbles can be easily generated or grown inside the defoaming chamber 130, in an approximately vertical direction, a defoaming operation can be effectively performed in the defoaming chamber 130. In addition, the above-described defoaming operation is performed after the printing operation is performed. Thus, even when gas that flows in during the exchange of the ink cartridges IC1 to IC4 or gas that is dissolved in the ink becomes air bubbles in the ink supplying path due to a change in the temperature during the non-use of the printer 500 or the like, elimination of the air bubbles or suppression of the growth of the air bubbles can be performed.

B. Second Embodiment

Figure 4:
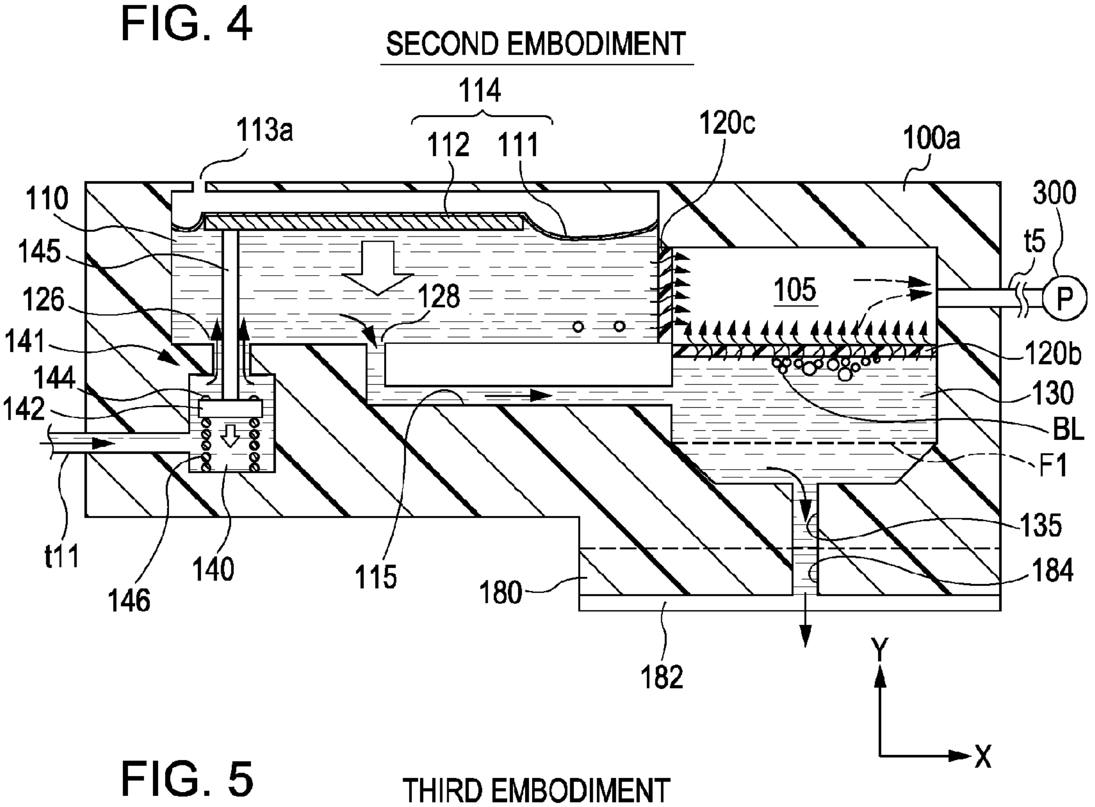
FIG. 4 is a cross-sectional view showing the internal structure of a carriage and a record head according to a second embodiment of the invention.

FIG. 4 is a cross-sectional view showing the internal structure of a carriage 100*a* and a record head 180 according to a second embodiment of the invention. According to a printer of the second embodiment, the positional relationship between a decompression chamber 105 and a compression chamber 110 in a carriage 100*a* is different from that of the printer 500 (FIG. 1), and the other configurations of the printer are the same as those according to the first embodiment.

In particular, the compression chamber 110 is adjacent to the left face of the decompression chamber 105. Here, the carriage 100*a* of the second embodiment includes, instead of the partition wall portion 120*a,* a partition wall portion 120*c* on the left face of the decompression chamber 105, that is, between the compression chamber 110 and the decompression chamber 105. This partition wall portion 120*c,* similarly to the partition wall portions 120*a* and 120*b* of the first embodiment, is configured by a member that has gas permeability. Accordingly, air bubbles that are generated inside the compression chamber 110 during the performing a decompression operation flow into the decompression chamber 105 from the right face of the compression chamber 110 so as to be eliminated.

The printer of the second embodiment having the above-described configuration also has advantages that are the same as those of the printer 500 of the first embodiment.

C. Third Embodiment

Figure 5:
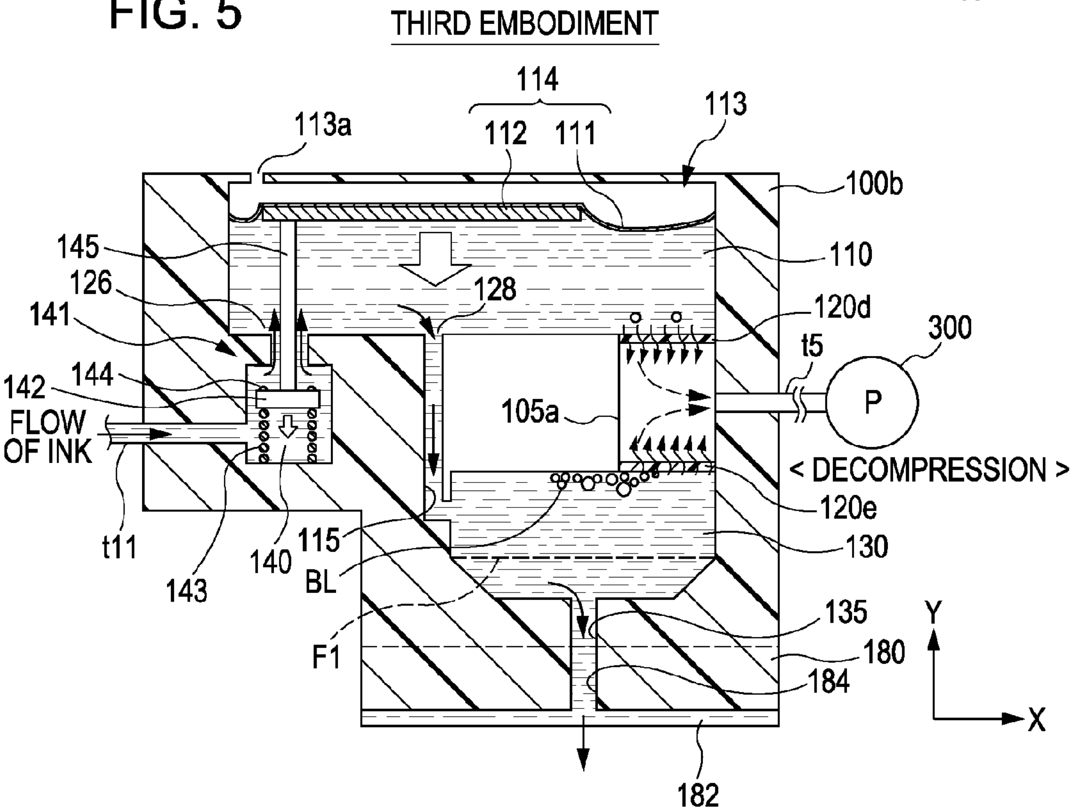
FIG. 5 is a cross-sectional view showing the internal structure of a carriage and a record head according to a third embodiment of the invention.

FIG. 5 is a cross-sectional view showing the internal structure of a carriage 100*b* and a record head 180 according to a third embodiment of the invention. According to a printer of the third embodiment, the size of the decompression chamber is different from that of the printer 500 (FIG. 1), and the other configurations of the printer are the same as those according to the first embodiment.

In particular, the length of a decompression chamber 105*a* of the third embodiment is shorter than that of the decompression chamber 105 (FIG. 2) of the first embodiment in the X direction. In addition, together with the shorter length of decompression chamber 105*a,* the length of a partition wall portion 120*d* between the decompression chamber 105*a* and a compression chamber 110 in the X direction is shorter than that of the partition wall portion 120*a* of the first embodiment in the X direction. Similarly, the length of a partition wall portion 120*e* between the decompression chamber 105*a* and a defoaming chamber 130 in the X direction is shorter than that of the partition wall portion 120*b* of the first embodiment in the X direction. In addition, the decompression chamber 105*a* is not disposed on the upper side of the ink ejection tube 135 of the defoaming chamber 130 in an approximately vertical direction.

The printer of the third embodiment having the above-described configuration also has advantages that are the same as those of the printer 500 of the first embodiment. In addition, since the size of the decompression chamber 105*a* and the sizes of partition wall portions 120*d* and 120*e* are smaller than those of the first embodiment, the manufacturing cost of the printer 500 can be suppressed. In addition, since the size of the decompression chamber 105*a* is relatively small, a relatively small pump can be used as a decompression pump 300.

D. Fourth Embodiment

Figure 6:
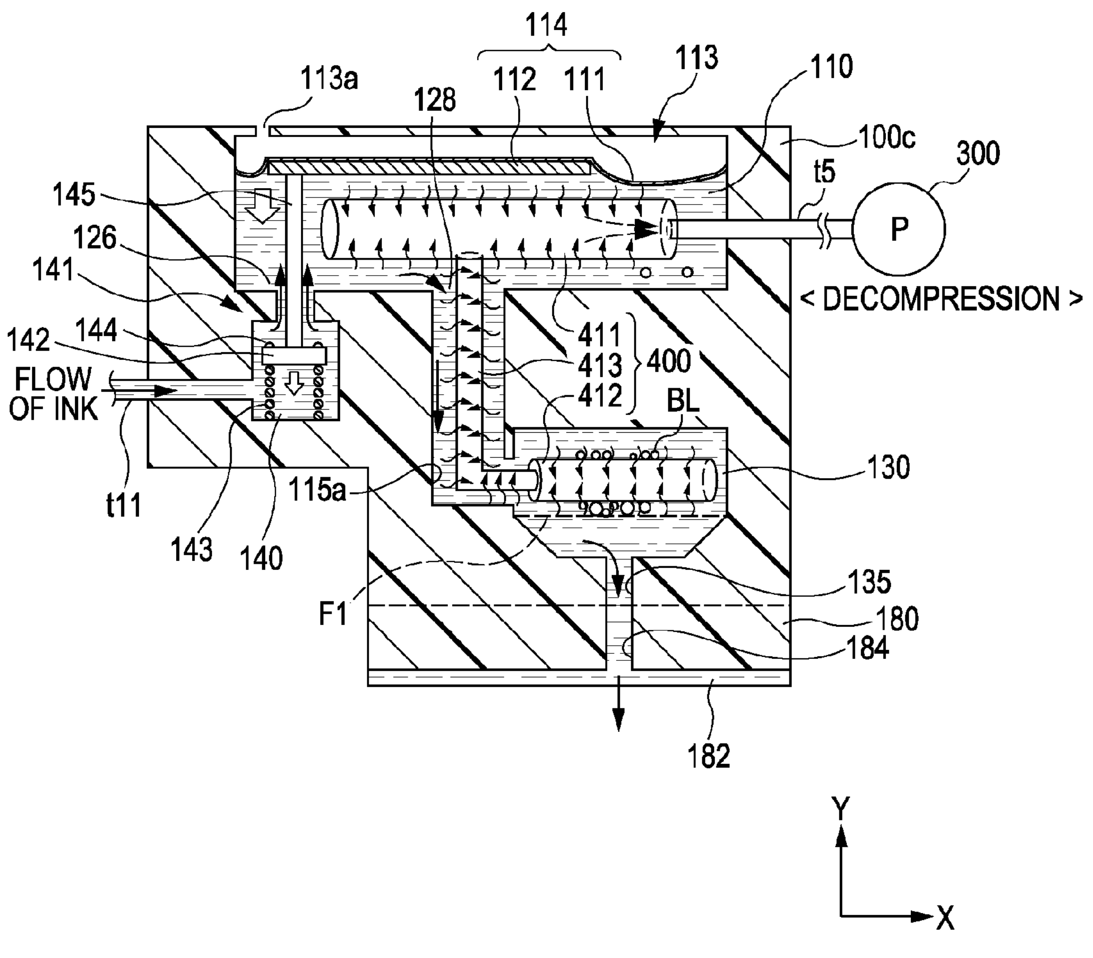
FIG. 6 is a cross-sectional view showing the internal structure of a carriage and a record head according to a fourth embodiment of the invention.

FIG. 6 is a cross-sectional view showing the internal structure of a carriage 100*c* and a record head 180 according to a fourth embodiment of the invention. According to a printer of the fourth embodiment, the configuration for performing the decompression operation is different from that of the printer

500 (FIG. 1), and the other configurations of the printer are the same as those according to the first embodiment.

In particular, a carriage 100*c* of the fourth embodiment includes a decompression tube 400 instead of the decompression chamber 105. This decompression tube 400 includes a first decompression chamber 411, a second decompression chamber 412, and a third decompression chamber 413. The first decompression chamber 411 is a cylindrical hollow chamber that is disposed inside a compression chamber 110. The first decompression chamber 411 is disposed so as not to be in contact with a partition wall portion 114 even in the case where the partition wall portion 114 is displaced to the lower side. The second decompression chamber 412 is a cylindrical hollow chamber that is disposed inside a defoaming chamber 130. The second decompression chamber 412 is disposed so as not to be in contact with the ceiling of the defoaming chamber 130 on the upper side of a filter F1 located inside the defoaming chamber 130. The third decompression chamber 413 is a hollow chamber that is disposed in an ink distribution tube 115*a*. This third decompression chamber 413 is disposed in the center portion inside the ink distribution tube 115*a* and is disposed so as not to be in contact with the wall face of the ink distribution tube 115*a*. In addition, since the ink distribution tube 115*a* of the fourth embodiment houses the third decompression chamber 413 therein, the cross-section area of the ink distribution tube 115*a* is larger than that of the ink distribution tube 115 of the first embodiment.

The third decompression chamber 413 connects the first decompression chamber 411 and the second decompression chamber 412 together. Accordingly, the decompression chambers 411, 412, and 413 are linked with one another. The wall faces of the decompression chambers 411, 412, and 413 have gas permeability, similarly to the partition wall portions 120*a* and 120*b* of the first embodiment. In addition, a decompression pump 300 is connected to the first decompression chamber 411. Thus, when the inside of the decompression tube 400 is in a negative-pressure state by using the decompression pump 300, air bubbles in the compression chamber 110, the defoaming chamber 130, and the ink distribution tube 115*a* flow into the inside of the decompression tube 400, whereby performing the defoaming operation.

According to the printer of the fourth embodiment having the above-described configuration, the defoaming operation for the compression chamber 110 and the defoaming chamber 130 is performed by one set of the decompression tube 400 and the decompression pump 300, and accordingly advantages that are the same as those of the first embodiment are acquired. In addition, the defoaming operation can be performed for the ink distribution tube 115*a* in addition to the compression chamber 110 and the defoaming chamber 130, and accordingly, many air bubbles (gas) can be eliminated from the inside of the ink supplying path.

E. Fifth Embodiment

E1. Configuration of Apparatus

Figure 7:
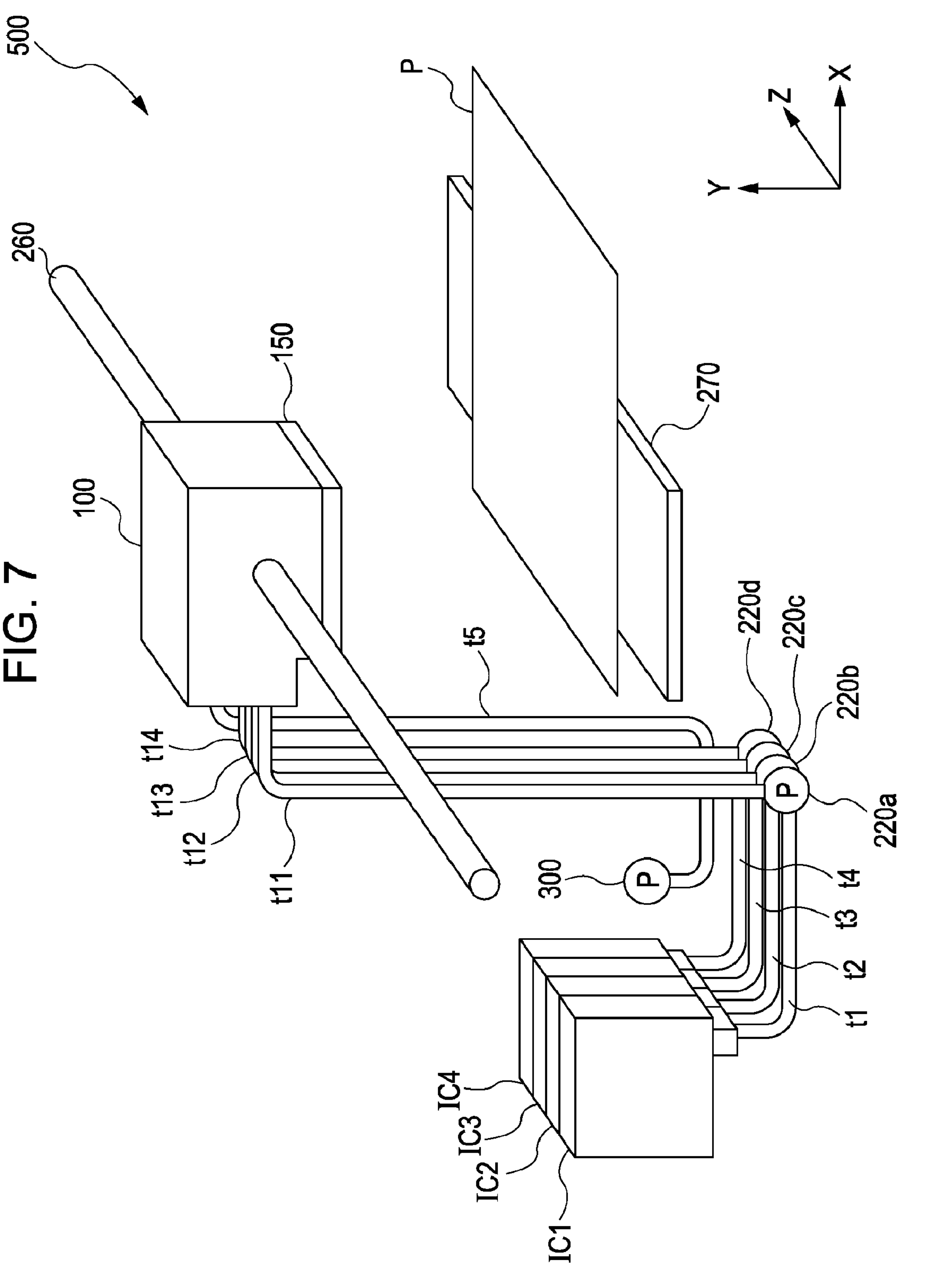
FIG. 7 is an explanatory diagram showing a schematic configuration of a printer that includes a carriage used as a defoaming mechanism according to an embodiment of the invention.

FIG. 7 is an explanatory diagram showing a schematic configuration of a printer 500 that includes a carriage 100 as a defoaming mechanism according to an embodiment of the invention. The printer 500 is an ink jet printer that can eject four colors (black, cyan, magenta, and yellow) of ink. The printer 500 includes an ink cartridge IC1 for black ink, an ink cartridge IC2 for cyan ink, an ink cartridge IC3 for magenta ink, an ink cartridge IC4 for yellow ink, a carriage 100, a record head 150, a guide rod 260, a platen 270, four ink supply pumps 220*a,* 220*b,* 220*c,* and 220*d,* and a decompression pump 300.

The printer 500 is a so-called off-carriage-type printer in which four ink cartridges IC1 to IC4 are mounted to the printer main body side. The ink cartridge IC1 is connected to the carriage 100 through a tube t1, the ink supply pump 220*a,* and a tube t11. Similarly, the ink cartridges IC2, IC3, IC4 are connected to the carriage 100 through a tube t2, the ink supply pump 220*b,* and a tube 12, through a tube t3, the ink supply pump 220*c,* and a tube t13, and through a tube t4, the ink supply pump 220*d,* and a tube 14, respectively. The decompression pump 300 is connected to the carriage 100 through a tube t5. In addition, the ink cartridges IC1 to IC4 are mounted on a main frame (not shown) of the printer 500 by a cartridge holder not shown in the figure.

The ink supply pump 220*a* supplies black ink stored in the ink cartridge IC1 to the carriage 100. Similarly, the ink supply pump 220*b* supplies cyan ink stored in the ink cartridge IC2 to the carriage 100, the ink supply pump 220*c* supplies magenta ink stored in the ink cartridge IC3 to the carriage 100, and the ink supply pump 220*d* supplies yellow ink stored in the ink cartridge IC4 to the carriage 100. The decompression pump 300 is commonly used for all the colors (black, cyan, magenta, and yellow).

The guide rod 260 is disposed on the upper side (+Y direction) of the platen 270 along the longitudinal direction (a Z axis) of the platen 270. The carriage 100 is supported so as to be movable in the longitudinal direction of the platen 270 along the guide rod 260. In addition, the carriage 100 is driven through a timing belt (not shown) by a carriage motor (not shown). The record head 150 is disposed on the bottom face of the carriage 100. In addition, the record head 150 ejects ink droplets in the lower direction (−Y direction) from a plurality of nozzles (not shown) together with the reciprocating motion of the carriage 100 in the longitudinal direction. At this moment, a recording sheet P is sent on the platen 270 in the +X direction by a paper feeding mechanism not shown in the figure, and an image or the like is formed on the recording sheet P.

Figure 8A:
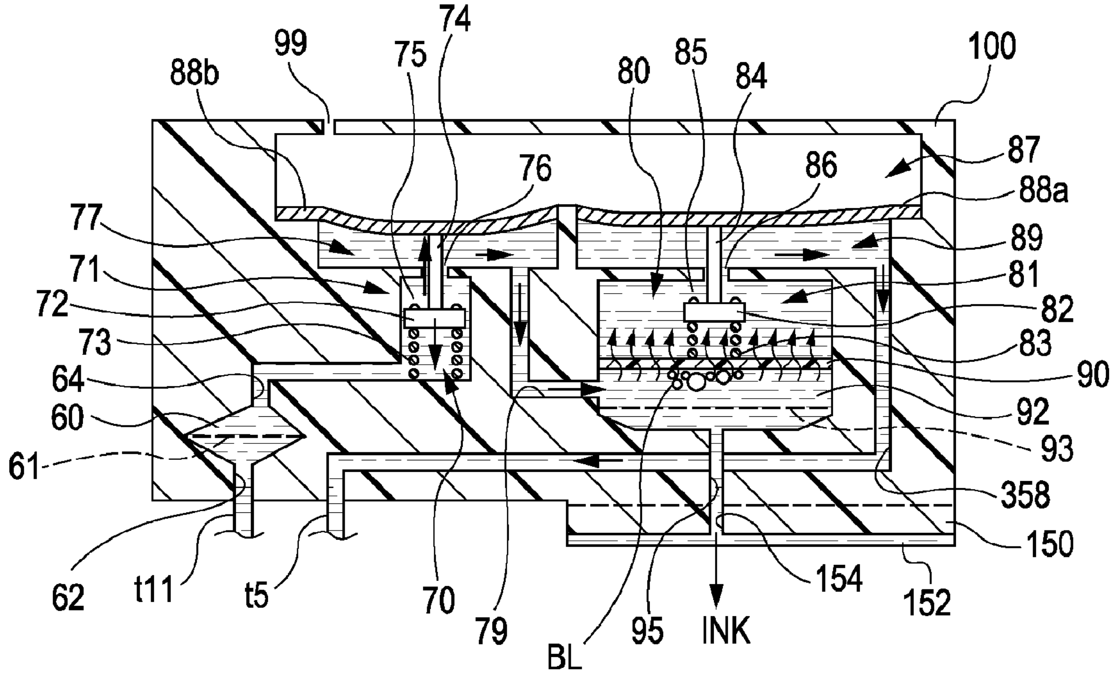
FIG. 8A is an explanatory diagram showing the state of the carriage and the record head during the ejection of ink.

FIG. 8A is an explanatory diagram showing the state of the carriage 100 and the record head 150 during the ejection of ink. FIG. 8A schematically shows the function of the carriage 100. Although the function relating to the supply of black ink is shown in FIG. 8A, the function relating to supply of ink of another color is the same.

The carriage 100 includes a filter chamber 60, an air chamber 87, a first compression chamber 77, a first pressure-adjusting valve 71, a defoaming chamber 92, a decompression chamber 80, a second compression chamber 89, a second pressure-adjusting valve 81, three internal flow paths 62, 64, and 79 through which ink is distributed, and a negative-pressure supplying path 358.

The filter chamber 60 includes a filter 61 therein. The filter chamber 60 is used for eliminating impurities by filtering the ink that has flowed therein. This filter chamber 60 is linked with the tube t11 through the internal flow path 62. In addition, the filter chamber 60 is linked with a valve chamber 70 to be described later through the internal flow path 64. The air chamber 87 is linked with the air outside through an air linkage hole 99.

The first compression chamber 77 is used for adjusting the pressure of the ink supplying path inside the carriage 100 by temporarily collecting black ink. The first compression chamber 77 is adjacent to the air chamber 87 through a partition wall portion 88*b* as a ceiling portion. The partition wall portion 88*b* has flexibility and can be displaced in the vertical direction. The partition wall portion 88*b* may be configured by a film, for example, formed of a synthetic resin, rubber, or the like and a thin plate member of a cantilever (not shown) that can be displaced with the film. The first compression chamber 77 includes an ink inflow opening 76 and is linked with the valve chamber 70 to be described later through the ink inflow opening 76. In addition, the first compression chamber 77 is linked with a defoaming chamber 92 through the internal flow path 79.

The first pressure-adjusting valve 71 is used for controlling the flow of black ink. This first pressure-adjusting valve 71 includes the valve chamber 70, a valve body 72, a pressure adjusting spring 73, a sealing member 75, and a support rod 74. The valve chamber 70 is linked with the internal flow path 64. The valve body 72 is disposed inside the valve chamber 70 and is biased to the sealing position side by the pressure adjusting spring 73. The valve body 72 can be displaced between an opening position in which the first compression chamber 77 and the valve chamber 70 are linked with each other and a sealing position in which the first compression chamber 77 and the valve chamber 70 are not linked with each other. In particular, when the force pressing down the valve body 72 (suppressed pressure of the support rod 74 generated by the partition wall portion **88*b* and the pressure inside the first compression chamber 77) is stronger than the force lifting up the valve body 72 (the pressure inside the valve chamber 70 and the biasing force of the pressure adjusting spring 73) due to discharge of the ink from the first compression chamber 77, the valve body 72 is displaced toward the opening position. On the other hand, when the force pressing down the valve body 72 is weaker than the force lifting up the valve body 72 due to inflow of ink into the first compression chamber 77, the valve body 72 is displaced toward the sealing position. In addition, in the example shown in FIG. 8A, the valve body 72 is in the opening position. The sealing member 75 is disposed on the top face of the valve body 72. The sealing member 75 seals ink so as not to flow from the valve chamber 70 to the first compression chamber 77 in the case where the valve body 72 is disposed in the sealing position. The support rod 74 extends from the partition wall portion 88*b* through the first compression chamber and the the valve chamber 70 to the valve body 72. The support rod 74 has one end bonded to the valve body 72 and the other end bonded to the partition wall portion 88*b* of the first compression chamber 77**.

The defoaming chamber 92 is used for capturing air bubbles by temporarily storing the ink that have flowed in from the internal flow path 79. This defoaming chamber 92 includes a filter 93 therein. The defoaming chamber 92 is linked with the internal flow path 79 on the upper side of the filter 93. In addition, the defoaming chamber 92 is also linked with the ink ejecting flow path 95. The filter 93 has the function of capturing (trapping) the air bubbles in the ceiling portion of the defoaming chamber 92 by not allowing the air bubbles flowing inside the ink supplying path to easily pass through the ink supplying path.

The decompression chamber 80 is used for eliminating air bubbles from the ink captured in the defoaming chamber 92 by using a pressure difference between the defoaming chamber 92 and the decompression chamber 80. This decompression chamber 80 is disposed on the upper side of the defoaming chamber 92. In addition, the decompression chamber 80 is located adjacent to the defoaming chamber 92 through a partition wall portion 90 having gas permeability.

The second compression chamber 89 is used for supplying negative pressure, which is supplied from the decompression pump 300, to the decompression chamber 80. This second compression chamber 89 is disposed on the upper side of the decompression chamber 80 and is linked with the tube t5 through the negative-pressure supplying path 358. In addition, the second compression chamber 89 is linked with the decompression chamber 80 through a linkage hole 86. The second compression chamber 89 is located adjacent to the air chamber 87 through a partition wall portion **88*a* used as a ceiling portion. In addition, the partition wall portion 88*a* has a same configuration as the above-described partition wall portion 88*b*. However, the partition wall portion 88*a* and the partition wall portion 88*b*** can be independently displaced without being brought into contact with each other.

The second pressure-adjusting valve 81 is disposed inside the second compression chamber 89 and adjacent the decompression chamber 80. The second pressure-adjusting valve 81 is used for controlling the supply of negative pressure from the second compression chamber 89 to the decompression chamber 80. The second pressure-adjusting valve 81 has the same configuration as the above-described first pressure-adjusting valve 71. In other words, the second pressure-adjusting valve 81 includes a valve body 82, a pressure adjusting spring 83, a sealing member 85, and a support rod 84. The valve body 82 can be displaced between an opening position in which the second compression chamber 89 and the decompression chamber 80 are linked with each other and a sealing position in which the second compression chamber 89 and the decompression chamber 80 are not linked with each other. The valve body 82 is pushed to the sealing position side by the pressure adjusting spring 83. In the example shown in FIG. 8A, the valve body 82 is disposed in the opening position. The sealing member 85 maintains negative pressure inside the decompression chamber 80 by sealing the linkage hole 86 in the case where the valve body 82 is disposed in the sealing position. The support rod 84 has one end bonded to the valve body 82 and the other end bonded to a partition wall portion **88*a***.

The record head 150 is disposed on the bottom face of the carriage 100 and ejects ink toward the recording sheet P (FIG. 7). This record head 150 includes a nozzle plate 152 and an ink ejecting flow path 154. The ink ejecting flow path 154 is linked with the ink ejecting flow path 95 of the carriage 100 and leads the ink supplied from the defoaming chamber 92 to the nozzle plate 152. The nozzle plate 152 includes a plurality of nozzles (not shown).

The above-described printer 500 corresponds to a liquid ejecting apparatus according to an embodiment of the invention.

E2. Ink Supplying Operation of Carriage 100

When ink is consumed by being ejected from a plurality of nozzles (not shown) disposed in the nozzle plate 152 shown in FIG. 8A, the pressure of the first compression chamber 77 decreases due to a decrease in the amount of ink. Then, the pressure of the first compression chamber 77 becomes lower than the pressure (atmospheric pressure) of the air chamber 87, and the partition wall portion **88*b* is bent towards the inside of the first pressure chamber 77 so as to be displaced to the lower side due to the pressure difference. At this moment, the valve body 72 is pressed down by the support rod 74. Then, when the valve body 72 is in the opening position by overcoming the biasing force of the pressure adjusting spring 73, the ink inflow opening 76 is opened, and accordingly, the ink flows into the first compression chamber 77**.

Figure 8B:
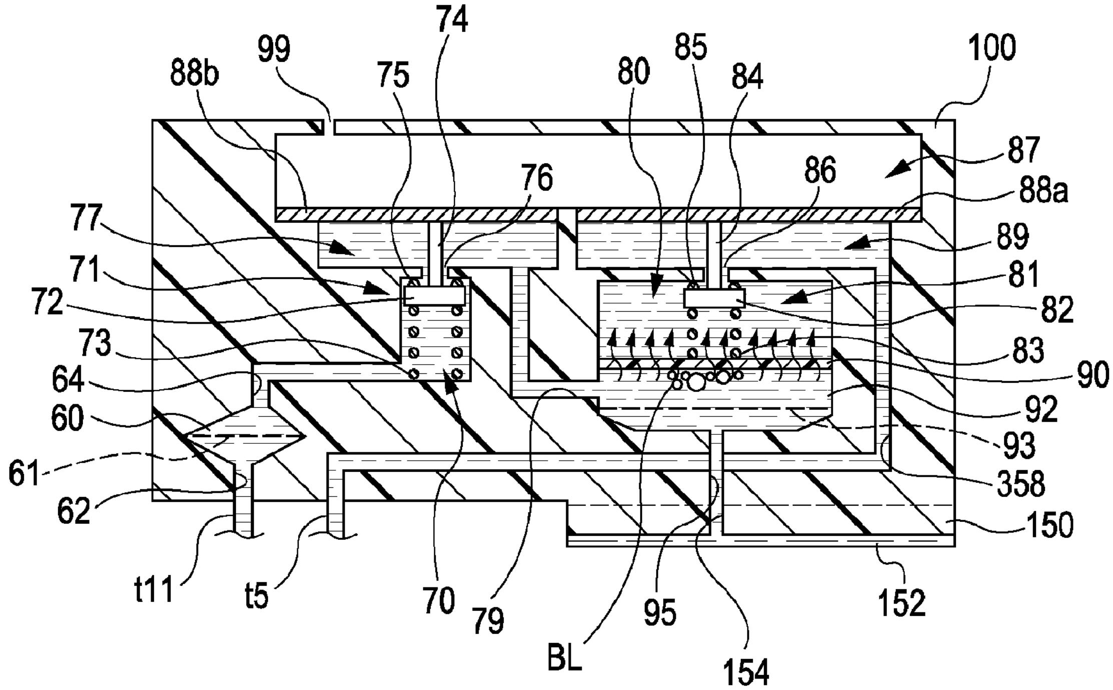
FIG. 8B is a cross-sectional view showing the state of the carriage and the record head after ink has flowed into a first compression chamber from an opened ink inflow opening.

FIG. 8B is a cross-sectional view showing the state of the carriage 100 and the record head 150 after the ink flows into the first compression chamber 77 from the opened ink inflow opening 76. When the chamber pressure of the first compression chamber 77 is increased by having the ink flow into the first compression chamber 77, the partition wall portion **88*b* is displaced to the upper side. When the valve body 72 is moved to the sealing position again in accordance with the above-described displacement of the partition wall portion 88*b*, the inflow of ink into the first compression chamber 77 is stopped, and the supply of the ink to the record head 150 is stopped. As described above, the printer 500 is configured such that ink corresponding to the consumed amount appropriately flows into the record head 150 by opening or closing the first pressure-adjusting valve 71**.

E3. Defoaming Operation

The negative pressure generated by the decompression pump 300 (FIG. 7) is supplied to the second compression chamber 89 through the tube t5 and a negative-pressure supplying path 358 (FIG. 8A). At this moment, the partition wall portion 88*a* is bent to the inside of the second compression chamber 89 so as to be displaced to the lower side due to a pressure difference between the pressure (negative pressure) of the second compression chamber 89 and the pressure (atmospheric pressure) of the air chamber 87. The valve body 82 is pressed down due to the support rod 84. Then, when the valve body 82 is in the opening position, the linkage hole 86 is opened, and the negative pressure is supplied to the decompression chamber 80. Then, the pressure of the decompression chamber 80 becomes lower than the pressure of the defoaming chamber 92. Accordingly, the air bubbles (gas) BL that are trapped in the ceiling portion of the defoaming chamber 92 are transmitted through the partition wall portion 90 so as to flow into the decompression chamber 80 due to a pressure difference between the decompression chamber 80 and the defoaming chamber 92.

E4. Detailed Configuration of Partition Wall Plate

Figure 9:
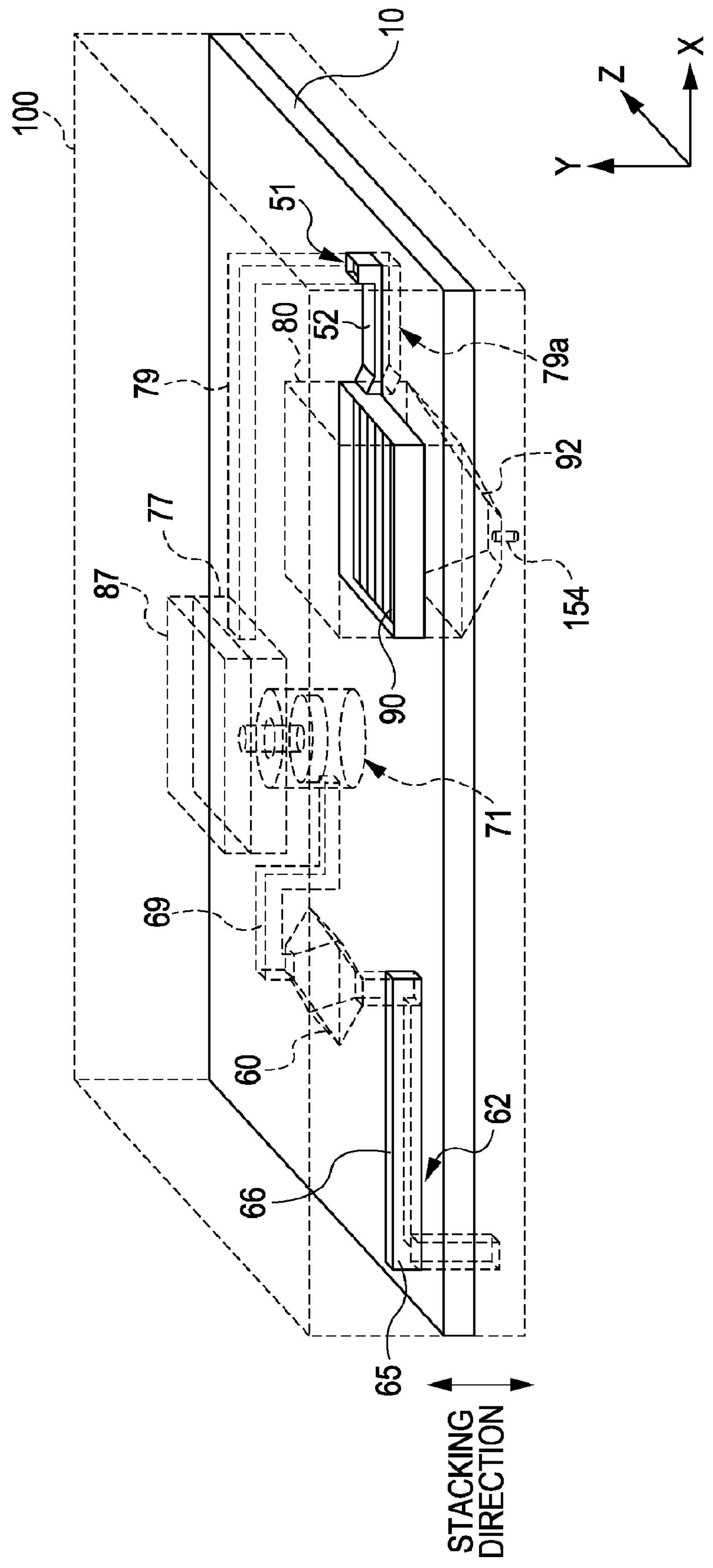
FIG. 9 is a perspective view showing a detailed configuration of the carriage.

FIG. 9 is a perspective view showing a detailed configuration of the carriage 100. In FIG. 9, for the convenience of drawing, only a configuration relating to the supply of black ink is shown. The carriage 100 having the above-described configuration (function) has a configuration in which a plurality of thin plate members (hereinafter, referred to as a "plate") is stacked in the vertical direction (Y axis). All the shapes of faces (the stacking face: the X-Z plane) of the plurality of plates that are perpendicular to the stacking direction are rectangles having a same size. In the example shown in FIG. 9, the partition wall plate 10 from among the plurality of stacked plates is shown, and other plates are omitted in the figure.

The partition wall plate 10 includes a partition wall portion 90, a flow path forming portion 52, and a flow path forming portion 66. The flow path forming portion 52 is a groove that is formed on the rear face (a lower-side face of the stacking faces) of the partition wall plate 10. The flow path forming portion 52 forms a flow path 79*a* that constitutes a part of the internal flow path 79 when a plate (not shown) is stacked and brought into contact with the rear face of the partition wall plate 10. In addition, one end of the flow path forming portion 52 (groove) is connected to the partition wall portion 90, and the other end of the flow path forming portion 52 is connected to a through hole 51 that perforates the partition wall plate 10. The flow path forming portion 66 is a groove that is formed on the surface of the partition wall plate 10. The flow path forming portion 66 forms the internal flow path 62 when a plate (not shown) is stacked and brought into contact with the surface (an upper-side face of the stacking faces) of the partition wall plate 10. In addition, one end of the flow path forming portion 66 is connected to a distribution hole 65 that is disposed on the rear face of the partition wall plate 10.

Figure 10:
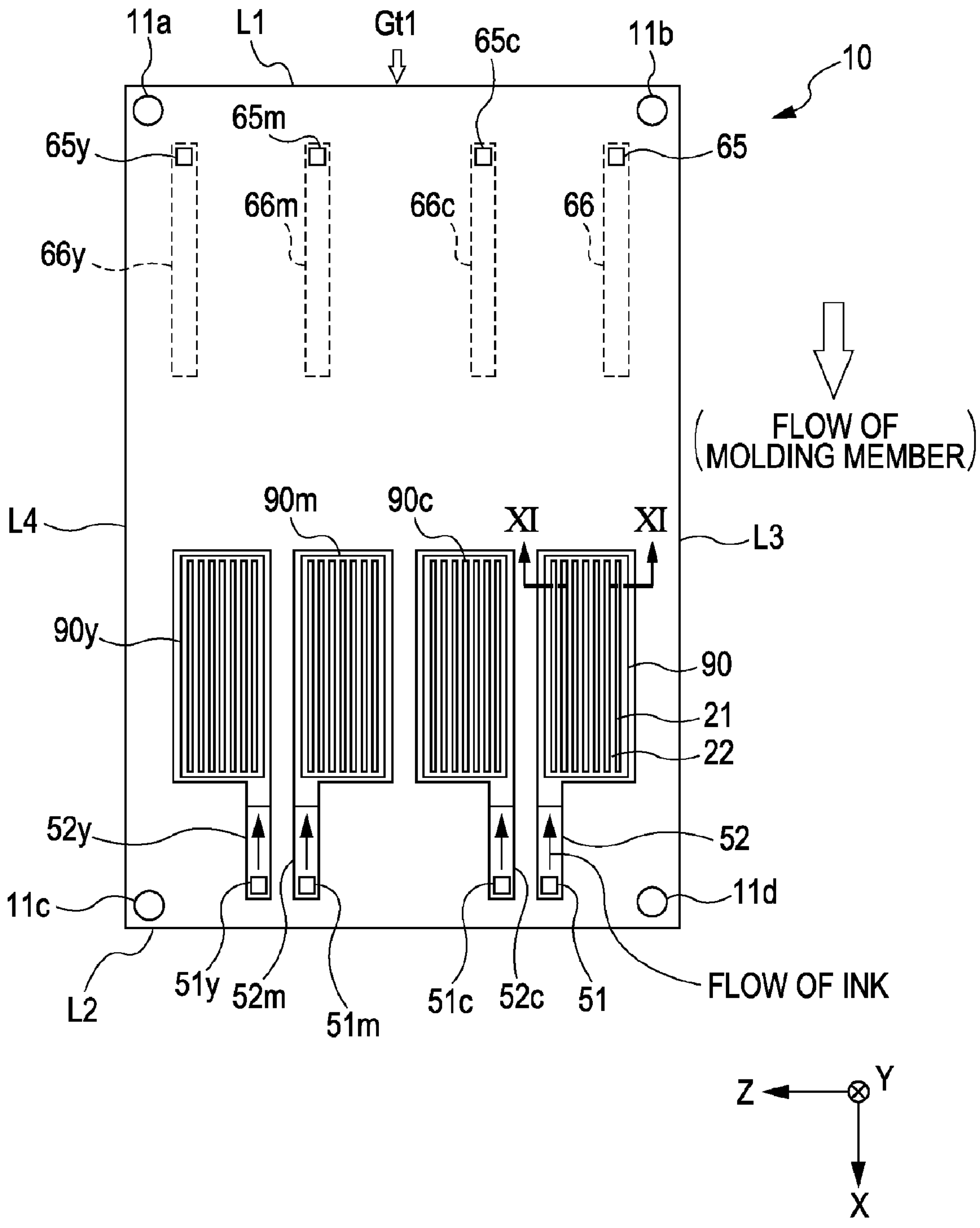
FIG. 10 is a plan view showing a detailed configuration of a partition wall plate shown in FIG. 9.

FIG. 10 is a plan view showing a detailed configuration of the partition wall plate 10 shown in FIG. 9. In FIG. 10, a configuration of the partition wall plate 10 viewed from the rear face shown in FIG. 9 is shown. In addition, in FIG. 10, differently from FIG. 9, the configuration relating to the supply of ink of all the colors is shown.

The partition wall plate 10 has a configuration that is the same as that of the above-described black ink as a configuration relating to the supply of cyan ink. In particular, a partition wall portion 90*c* for cyan ink is disposed to the left side of the partition wall portion 90 for black ink. In addition, the partition wall plate 10 has a flow path forming portion 52*c* for cyan ink disposed to the left side of the flow path forming portion 52 for black ink and a flow path forming portion 66*c* for cyan ink disposed to the left side of the flow path forming portion 66 for black ink. In addition, the configuration of the partition wall portion 90*c* is the same as that of the partition wall portion 90. In addition, the configuration of the flow path forming portion 52*c* is the same as that of the flow path forming portion 52, and the configuration of the flow path forming portion 66*c* is the same as that of the flow path forming portion 66. Similarly, the partition wall plate 10 has the configuration (a partition wall portion 90*m* and flow path forming portions 52*m* and 66*m*) relating to the supply of magenta ink disposed to the left side of the above-described configuration relating to the supply of cyan ink, and has the configuration (a partition wall portion 90*y* and flow path forming portions 52*y* and 66*y*) relating to the supply of yellow ink disposed to the left side of the configuration relating to the supply of magenta ink.

On four corners of the partition wall plate 10, through holes 11*a*, 11*b*, 11*c*, and 11*d* are formed that are used for being staked and fastened with other plates (not shown).

Here, all the four partition wall portions 90, 90*c*, 90*m*, and 90*y* have the same rib shape. In particular, the partition wall portion 90 has a planar shape in which streaky-shaped concave portions 21 that extend in a direction parallel to the X axis and streaky-shaped convex portions 22 that extend in a direction parallel to the X axis are alternately disposed along the Z axis. Since ink flows from the flow path forming portion 52 to the partition wall portion 90, the concave portions 21 and the convex portions 22 extend in a direction along the direction of inflow of the ink.

Figure 11:
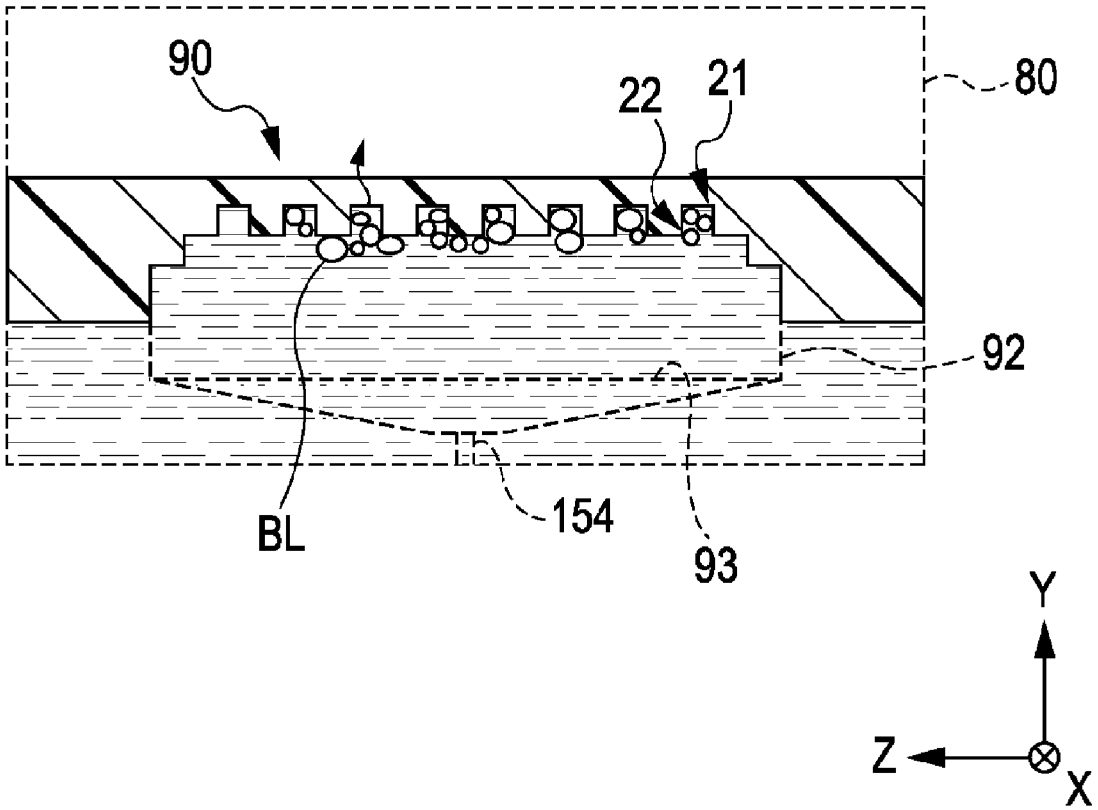
FIG. 11 is a cross-sectional view taken along line XI-XI shown in FIG. 10.

FIG. 11 is a cross-sectional view taken along line XI-XI shown in FIG. 10. In FIG. 11, for the convenience of description, the decompression chamber 80 that is adjacently disposed on the upper side of the partition wall portion 90, and the defoaming chamber 92 that is adjacently disposed on the lower side of the partition wall portion 90 are denoted by broken lines.

While the wall of the partition wall portion 90 that is brought into contact with the defoaming chamber 92 has a concave-convex shape, the wall of the partition wall portion 90 that is brought into contact with the decompression chamber 80 is flat. Accordingly, the thickness of the concave portion 21 is configured to be smaller than that of the convex portion 22 in the Y direction. In particular, for example, the thickness of the concave portion 21 in the Y direction may be set to 0.3 mm, and the thickness of the convex portion 22 may be set to 0.5 mm.

In addition, the above-described partition wall plate 10 corresponds to a single member according to an embodiment of the invention. In addition, the wall of the partition wall portion 90 that is brought into contact with the defoaming chamber 92 corresponds to a first wall according to an embodiment of the invention, the wall of the partition wall portion 90 that is brought into contact with the decompression chamber 80 corresponds to a second wall according to an embodiment of the invention, and the rib shape of the partition wall portion 90 corresponds to a reinforced shape according to an embodiment of the invention.

E5. Manufacturing Process of Carriage 100

Figure 12:
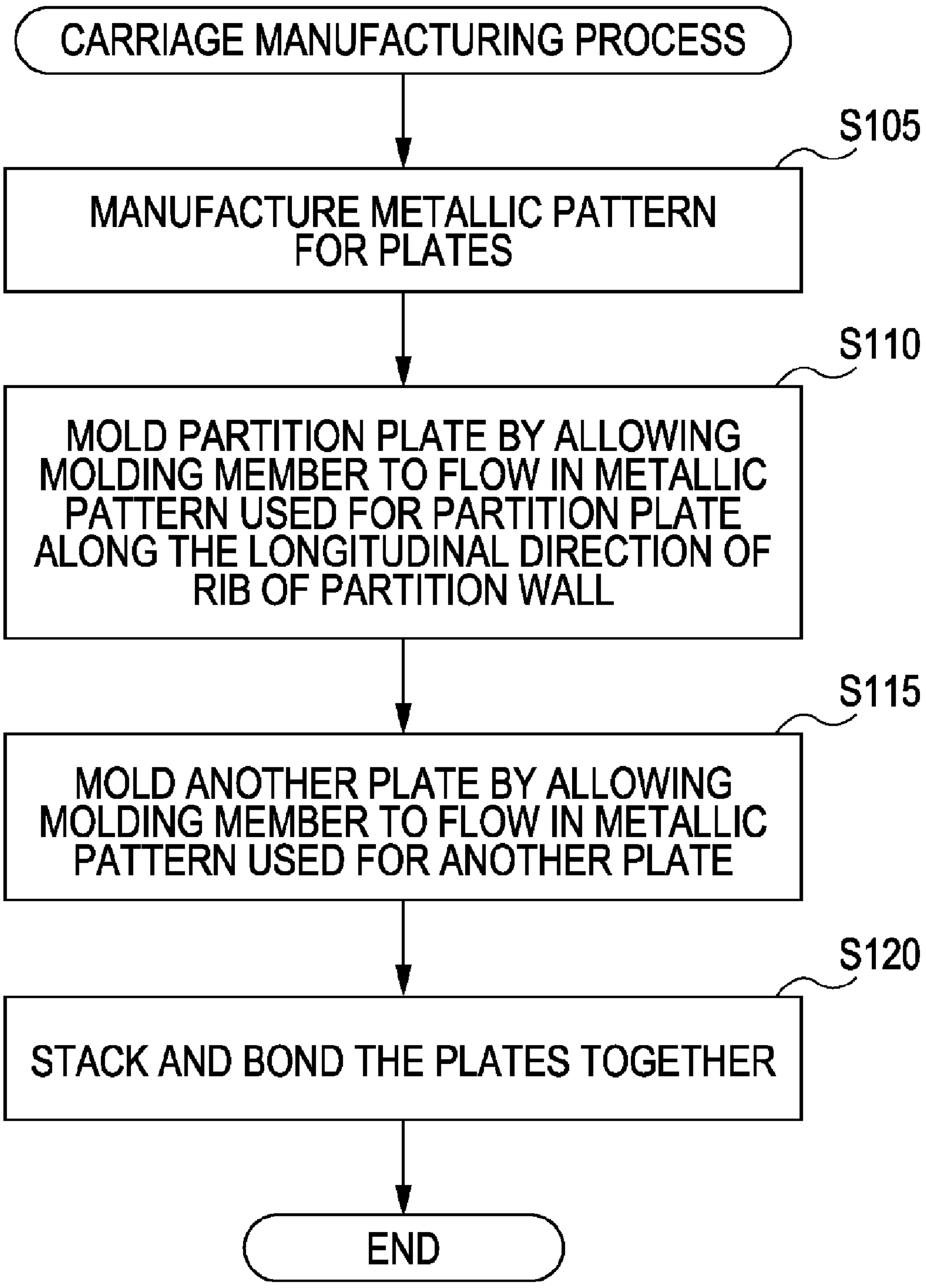
FIG. 12 is a flowchart showing the sequence of a manufacturing process of the carriage.

FIG. 12 is a flowchart showing the sequence of the manufacturing process of the carriage 100. When the above-described carriage 100 is manufactured, first, a molding pattern for each plate configuring the carriage 100 is manufactured (Step S105). Next, a molding material is allowed to flow into the molding pattern for the partition wall plate 10 along the longitudinal direction of the rib shape of the partition wall portion 90 so as to mold the partition wall plate 10 (Step S110).

In the example shown in FIG. 10, the molding material is allowed to flow such that the center of the upper side L1 (a side that is close to distribution holes 65, 65*c*, 65*m*, and 65*y* and is parallel to the Z axis) of the partition wall plate 10 out of four sides L1 to L4 of the partition wall plate 10 is set as the gate position Gt1. Accordingly, the molding material that flows in from the gate position Gt1 flows toward the lower side L2 of the partition wall plate 10. Here, the partition wall portion 90 has the rib shape in which the concave portions 21 and the convex portions 22 extend along the X direction, and accordingly, the direction (the direction from the upper side L1 toward the lower side L2 (+X direction)) in which the molding material flows in the molding pattern is set to a direction along the longitudinal direction of the rib shape. In addition, in order to acquire the gas permeability in the partition wall portion 90, for example, polyacetal, polypropylene, polyphenylene ether, or the like may be used as the molding material.

After the partition plate 10 is molded, other plates are molded by allowing the molding material to flow into the molding patterns in the same manner (Step S115). Next, the molded plates are stacked and bonded together (Step S120).

As described above, in the carriage 100, the concave portion 21 included in the partition wall portion 90 is configured so as to be thin, and accordingly, the defoaming capability for the air bubbles contained in the ink can be improved. In addition, since the wall of the partition wall portion 90 that is brought into contact with the defoaming chamber 92 has the concave-convex shape, the strength of the partition wall portion 90 can be improved, compared to a configuration in which the thickness of the partition wall portion 90 is the same as that of the concave portion 21. In addition, by increasing the contact area for the air bubbles, more air bubbles can be captured. As described above, since the strength of the partition wall portion 90 can be improved, the partition wall portion 90 can be integrally formed as the same plate as other constituent elements (the flow path forming portions 52 and 66). Accordingly, the number of components of the carriage 100 can be decreased.

In addition, since more air bubbles can be captured, the defoaming chamber 92 and the decompression chamber 80 can be miniaturized. In addition, during the molding of the partition wall plate 10, the molding material flows in a direction along the longitudinal direction of the rib shape of the partition wall portion 90, and accordingly, the flow of the molding material can be improved inside the molding pattern. Accordingly, the molding material reaches even a portion (for example, a portion near the lower side L2 (FIG. 10) of the partition wall plate 10) that is a portion apart far from the gate position Gt1 by passing through the partition wall portions 90, 90*c*, 90*m*, and 90*y*, holes opening in the partition wall portion 90 without being filled with the molding material can be suppressed. In addition, the rib shapes (the concave portion 21 and the convex portion 22) of the partition wall portions 90, 90*c*, 90*m*, and 90*y* are formed so as to extend in a direction following the direction of inflow of the ink. Accordingly, in the case where a preliminary ejection operation (an operation for discharging air bubbles inside the ink supplying path from nozzles (not shown) by ejecting ink separately from a printing operation) is performed after ejection of the ink, by moving the air bubbles BL that are captured in the ceiling portion of the defoaming chamber 92 along the rib shape in accordance with the flow of the ink, the air bubbles BL can be easily discharged from the ink ejecting flow path 95.

F. Sixth Embodiment

Figure 13:
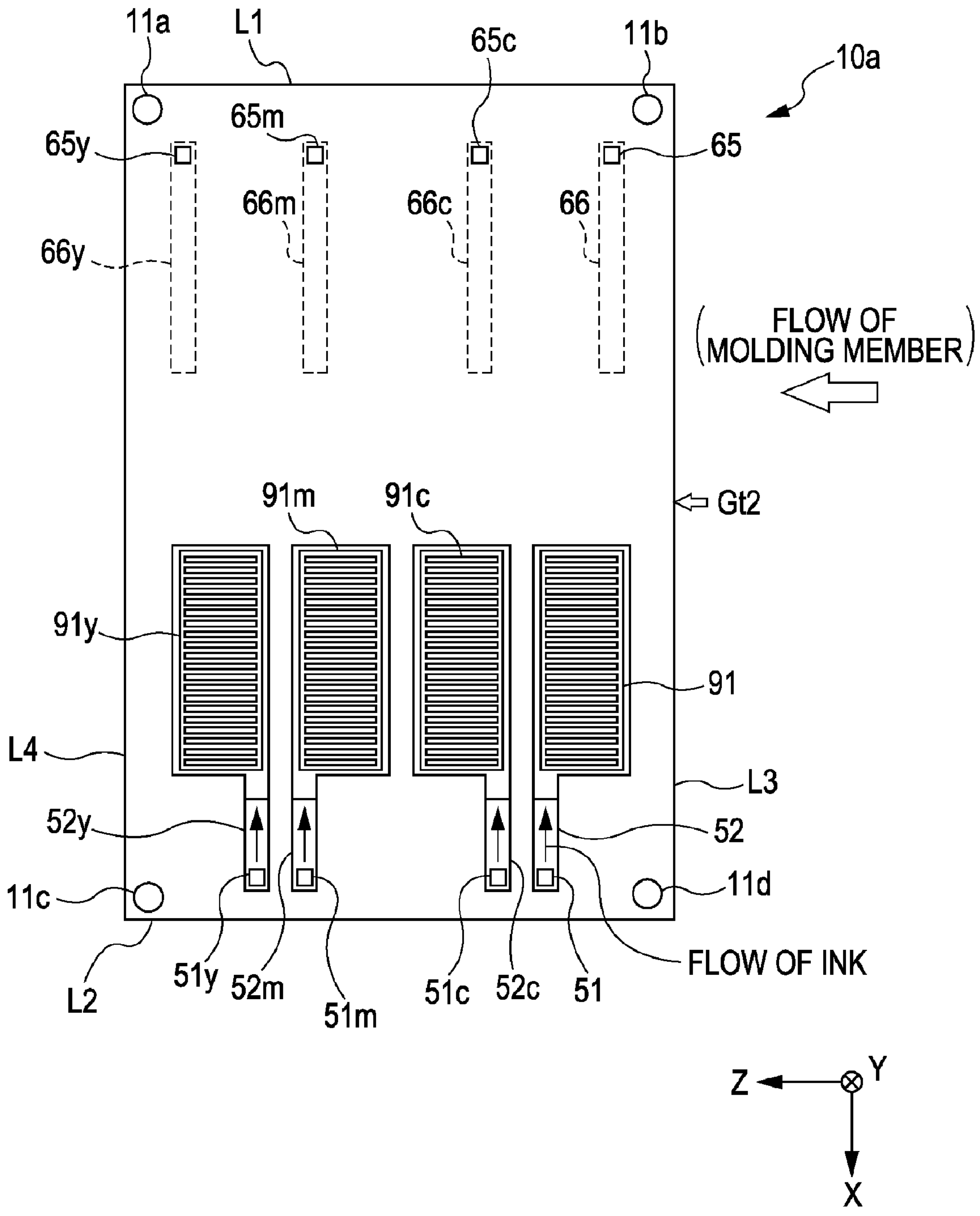
FIG. 13 is a plan view showing a detailed configuration of a partition wall plate according to a sixth embodiment of the invention.

FIG. 13 is a plan view showing a detailed configuration of a partition wall plate 10*a* according to a sixth embodiment of the invention. A carriage used as a defoaming mechanism according to the sixth embodiment has the configuration of the partition wall portion of the partition wall plate 10*a* that is different from that of the carriage 100 (FIGS. 7 to 12), and the other configurations and the sequence of the manufacturing process of the carriage are the same as those of the fifth embodiment.

In particular, while the longitudinal direction of the rib shape of the partition wall portion 90 for black ink according to the fifth embodiment is the vertical direction (the direction parallel to the X axis), the longitudinal direction of the rib shape of a partition wall portion 91 for black ink according to the sixth embodiment is the horizontal direction (the direction parallel to the Z axis). In such a configuration, the direction (−X direction) of inflow of the ink flowing into the partition wall portion 91 from the flow path forming portion 52 and the longitudinal direction of the rib shape of the partition wall portion 91 intersect each other. In addition, the partition wall portions 91*c*, 91*m*, and 91*y* of other colors have a same configuration.

Here, the gate position Gt2 of the molding material according to the sixth embodiment is set to the center of the right side L3 of the partition wall plate 10*a*, differently from the gate position Gt1 according to the fifth embodiment. In such a case, similarly to the fifth embodiment, the direction (the direction (+Z direction) from the right side L3 toward the left side L4) in which the molding material flows is the direction following the longitudinal direction of the rib shape of the partition wall portions 91, 91*c*, 91*m*, and 91*y*.

The carriage according to the sixth embodiment having the above-described configuration has the same advantages as the carriage 100 according to fifth embodiment. In addition, the rib shape of the partition wall portions 91, 91*c*, 91*m*, and 91*y* is formed so as to extend in a direction intersecting the direction of inflow of the ink. Accordingly, even when the ink flows into the defoaming chamber 92, the state in which the air bubbles are captured in the partition wall portions 91, 91*c*, 91*m*, and 91*y* can be maintained. As a result, inflow of the air bubbles into the record head 150 can be suppressed.

G. Seventh Embodiment

Figure 14:
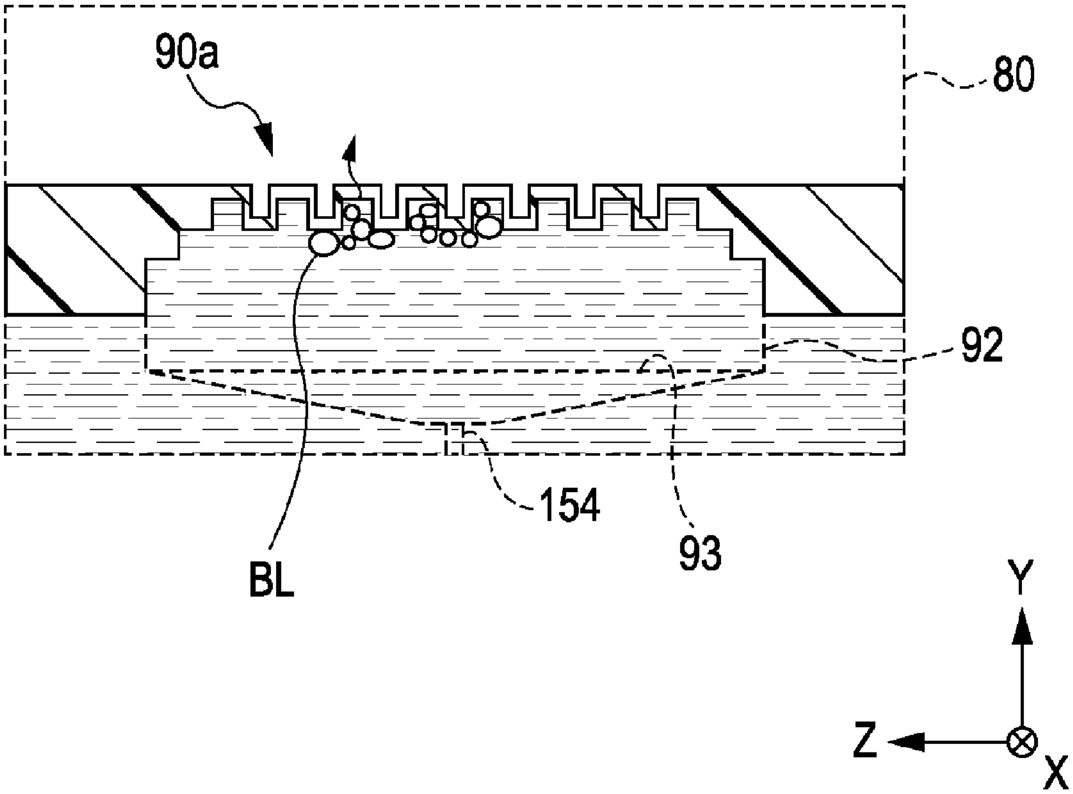
FIG. 14 is an explanatory diagram showing the cross-sectional shape of a partition wall portion according to a seventh embodiment of the invention.

FIG. 14 is an explanatory diagram showing the cross-sectional shape of a partition wall portion according to a seventh embodiment of the invention. A carriage used as a defoaming mechanism according to the seventh embodiment has the configuration of the partition wall portion of the partition wall plate that is different from that of the carriage 100 (FIGS. 7 to 12), and the other configurations and the sequence of the manufacturing process of the carriage are the same as those of the fifth embodiment.

In particular, while the partition wall portion 90 for black ink according to the fifth embodiment has a rib-shaped cross section in which the concave portions 21 and the convex portions 22 having different thicknesses are alternately disposed, the partition wall portion 90*a* for black ink according to the sixth embodiment, as shown in FIG. 14, has a waveform-shaped cross section in which concave portions and convex portions having a constant thickness are repeated. The thickness of the partition wall portion 90*a* may be configured to be the same as the thickness (for example, 0.3 mm) of the concave portion 21 that is included in the partition wall portion 90 of the fifth embodiment. In addition, the plan view of a partition wall plate according to the sixth embodiment is the same as the plan view (FIG. 10) of the partition wall plate 10*a* according to the fifth embodiment. In other words, the partition wall plate 10*a* has a plan view of a streaky shape that extends in a direction along the X axis. In addition, the partition wall portion (not shown) for other color inks also have the same configuration. The above-described waveform shape corresponds to a reinforced shape according to an embodiment of the invention.

The carriage according to the seventh embodiment having the above-described configuration has the same advantages as the carriage 100 according to the fifth embodiment. In addition, the thickness of the partition wall portion 90*a* can be configured so as to be thin in all positions, and accordingly, high defoaming capability can be implemented.

H. Eighth Embodiment

Figure 15:
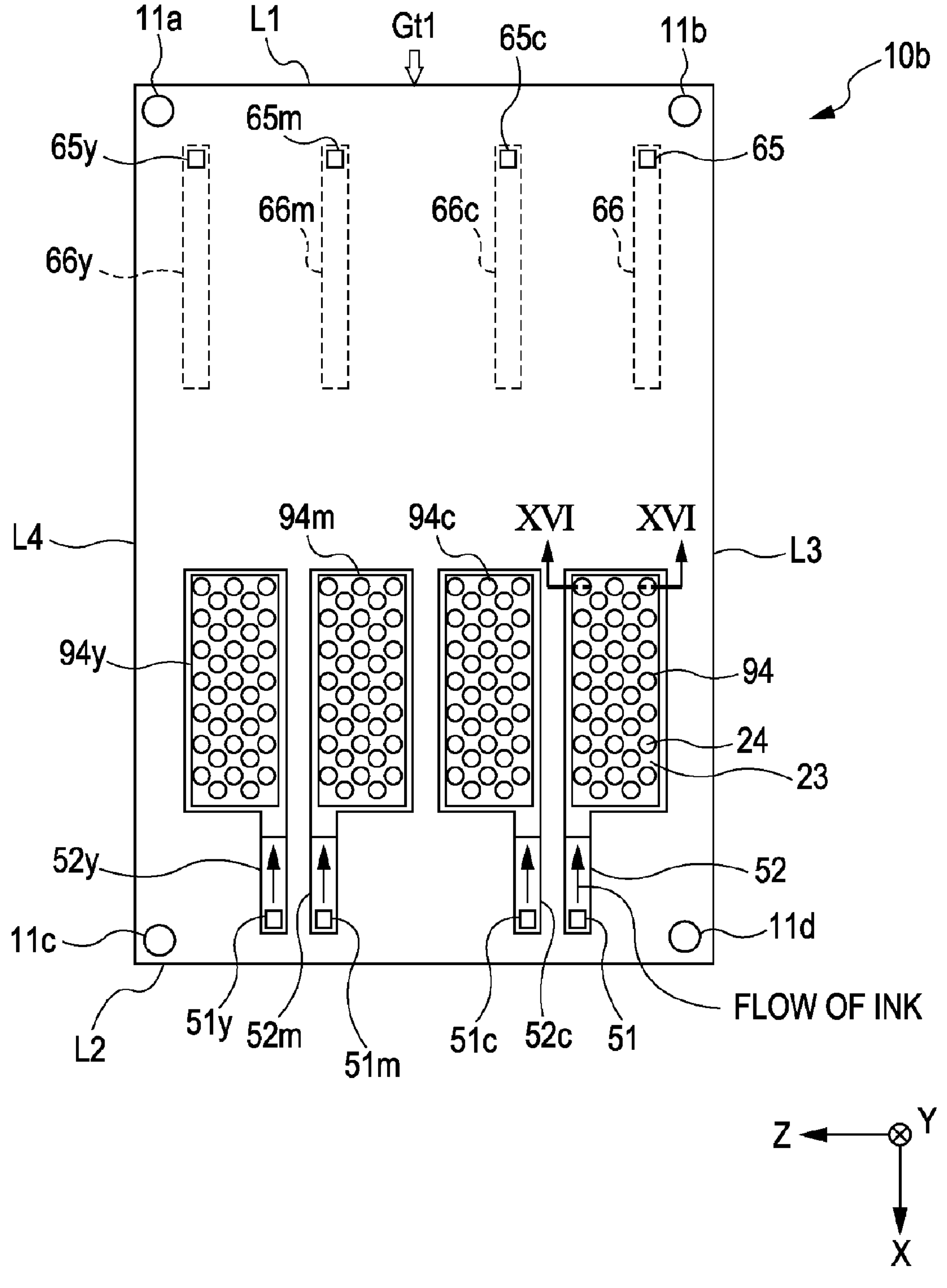
FIG. 15 is a plan view showing a detailed configuration of a partition wall plate according to an eighth embodiment of the invention.

FIG. 15 is a plan view showing a detailed configuration of a partition wall plate 10*b* according to an eighth embodiment of the invention. A carriage used as a defoaming mechanism according to the eighth embodiment has a configuration of the partition wall portion of the partition wall plate 10*b* that is different from that of the carriage 100 (FIGS. 7 to 12), and the other configurations and the sequence of the manufacturing process of the carriage are the same as those of the fifth embodiment.

In particular, while the shape of the partition wall portion 90 for black ink according to the fifth embodiment is the rib shape, the partition wall portion 94 for black ink according to the eighth embodiment has a dot shape in which thick portions 24 having a thin cylinder shape are disposed so as to be aligned at predetermined intervals with thin portions 23 used as a base. In addition, the partition wall portions 94*c*, 94*m*, and 94*y* for other color inks have the same configuration.

Figure 16:
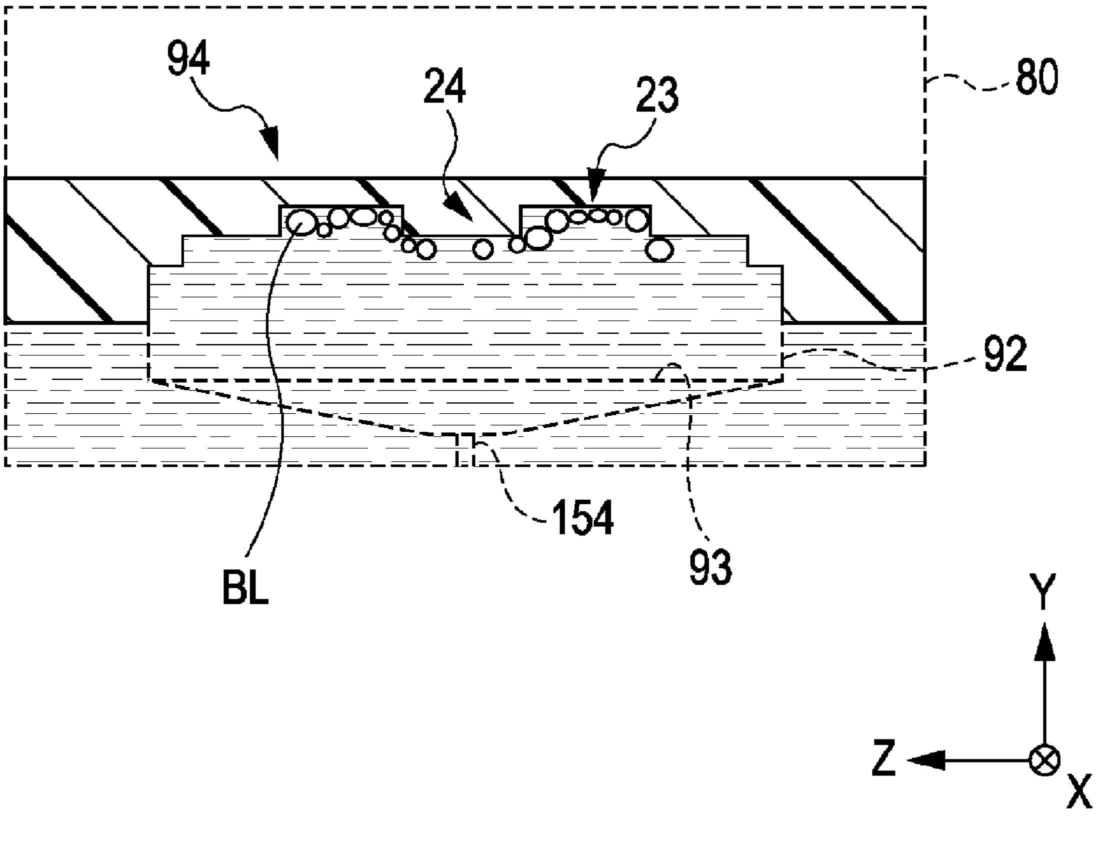
FIG. 16 is a cross-sectional view taken along line XVI-XVI shown in FIG. 15.

FIG. 16 is a cross-sectional view taken along line XVI-XVI shown in FIG. 15. In FIG. 16, similarly to FIG. 11, a decompression chamber 80 that is adjacently disposed on the upper side of a partition wall portion 94, and a defoaming chamber 92 that is adjacently disposed on the lower side of the partition wall portion 94 are denoted by broken lines.

The cross-sectional view of the partition wall portion 94 according to the eighth embodiment has the same shape as the cross-section of the partition wall portion 90 according to the fifth embodiment. In other words, while the wall that is brought into contact with the defoaming chamber 92 has a concave-convex shape, the wall that is brought into contact with the decompression chamber 80 is flat, and thin portions 23 have a thickness that is smaller than thick portions 24. In addition, the thicknesses of the thin portion 23 and the thick portion 24, similarly to the thicknesses of the concave portions 21 and the convex portions 22 according to the fifth embodiment, may be set, for example, to 0.3 mm and 0.5 mm. The above-described dot shape corresponds to a reinforced shape according to an embodiment of the invention.

The carriage according to the eighth embodiment having the above-described configuration has the same advantages as those according to the fifth embodiment.

I. Ninth Embodiment

Figure 17A:
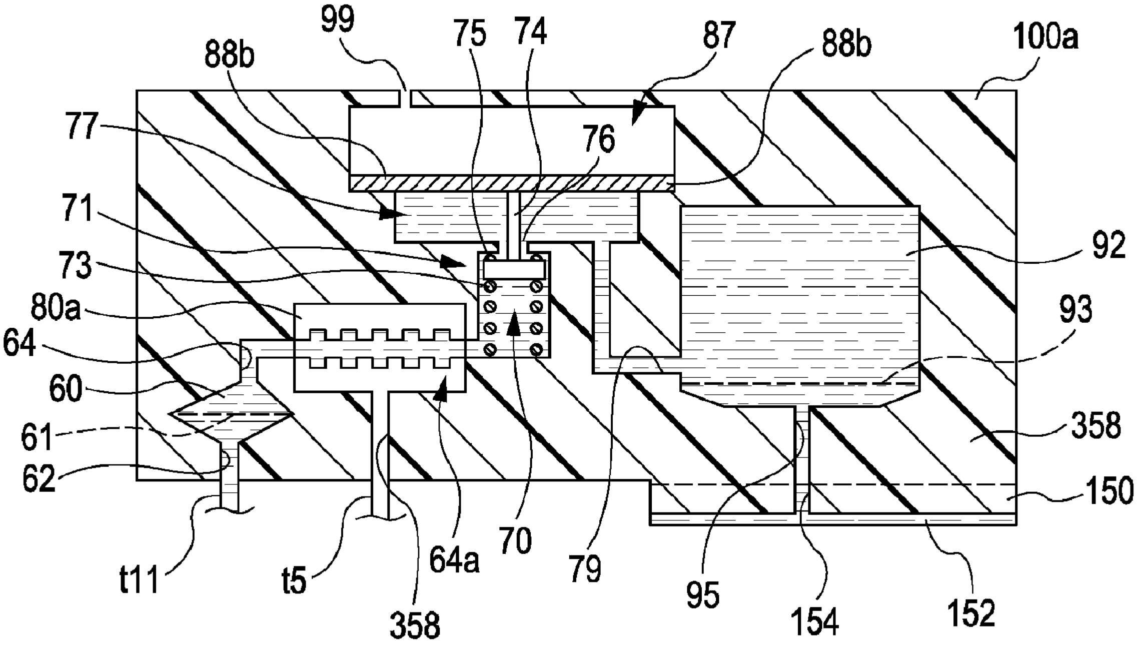
FIG. 17A is an explanatory diagram schematically showing the function of a carriage and a record head according to a ninth embodiment of the invention.

FIG. 17A is an explanatory diagram schematically showing the function of a carriage 100*a* and a record head 150 according to a ninth embodiment of the invention. FIG. 17A, similarly to FIG. 8B, shows the state of the carriage 100*a* and the record head 150 after the flow of the ink into a first compression chamber 77. The carriage 100*a* as a defoaming mechanism according to the ninth embodiment is different from the carriage 100 (FIGS. 7 to 12) in four points described below, and other configurations and the sequence of manufacturing the carriage are the same as those according to the fifth embodiment. In other words, the carriage 110*a* does not include the second compression chamber 89, the partition wall portion 88*a*, the second pressure-adjusting valve 81, and the partition wall portion 90, has a defoaming portion 64*a* in the middle of an internal flow path 64, includes a decompression chamber 80*a* instead of the decompression chamber 80, and has a negative pressure supplying path 358 connected to the decompression chamber 80*a*, which are different from the carriage 100.

In the fifth embodiment, the portion (the defoaming chamber 92) that is used for capturing air bubbles for performing a defoaming operation is disposed to be adjacent to the decompression chamber 80. However, in the ninth embodiment, such a portion (the defoaming portion 64*a*) is disposed inside the decompression chamber 80*a*. In addition, in the ninth embodiment, the defoaming chamber 92 is not used for capturing the air bubbles but for temporarily storing the ink.

Figure 17B:
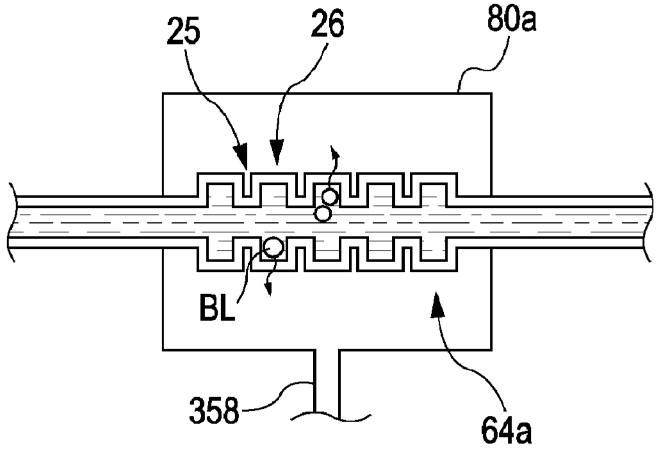
FIG. 17B is a cross-sectional view showing a detailed configuration of a defoaming portion and a decompression chamber.

FIG. 17B is a cross-sectional view showing a detailed configuration of the defoaming portion 64*a* and the decompression chamber 80*a* shown in FIG. 17A. The defoaming portion 64*a* is disposed inside the decompression chamber 80*a* and is used for capturing air bubbles contained in the distributed ink. This defoaming portion 64*a* has a hollow tube shape and is linked with the defoaming portion 64*a*. Accordingly, the ink flows through the inside of the defoaming portion 64*a*. The cross-sectional shape of the defoaming portion 64*a*, similar to the seventh embodiment, is a waveform shape (concave-convex shape) in which concave portions 25 and convex portions 26 are alternately disposed. All the concave portions 25 and the convex portions 26 have a constant thickness and are configured by members having gas permeability.

In the example shown in FIG. 17B, the air bubbles BL that are contained in the distributed ink are captured in the convex portions 26. When negative pressure is supplied to the decompression chamber 80*a* through a negative-pressure supplying path 358, the air bubbles BL flow into the decompression chamber 80*a* through the wall face of the convex portion 26. The defoaming portion 64*a* corresponds to a defoaming unit according to an embodiment of the invention. In addition, the waveform shape in which the concave portion 25 and the convex portion 26 are alternately disposed corresponds to a reinforced shape according to an embodiment of the invention.

The carriage 100*a* according to the ninth embodiment having the above-described configuration has the same advantages as those according to the fifth embodiment. In addition, since the defoaming portion 64*a* is disposed in the middle of the internal flow path 64, the defoaming chamber 92 can be miniaturized. In addition, in a configuration in which ink is supplied by being compressed by the ink supply pumps 220*a* to 220*d*, pressed ink flows through the defoaming portion 64*a*, and accordingly, a pressure difference between the pressure inside the defoaming portion 64*a* and the pressure inside the decompression chamber 80*a* can be easily generated. Accordingly, more air bubbles can be eliminated within a short time period, or a relatively small pump can be used as the decompression pump 300.

J. Tenth Embodiment

Figure 18A:
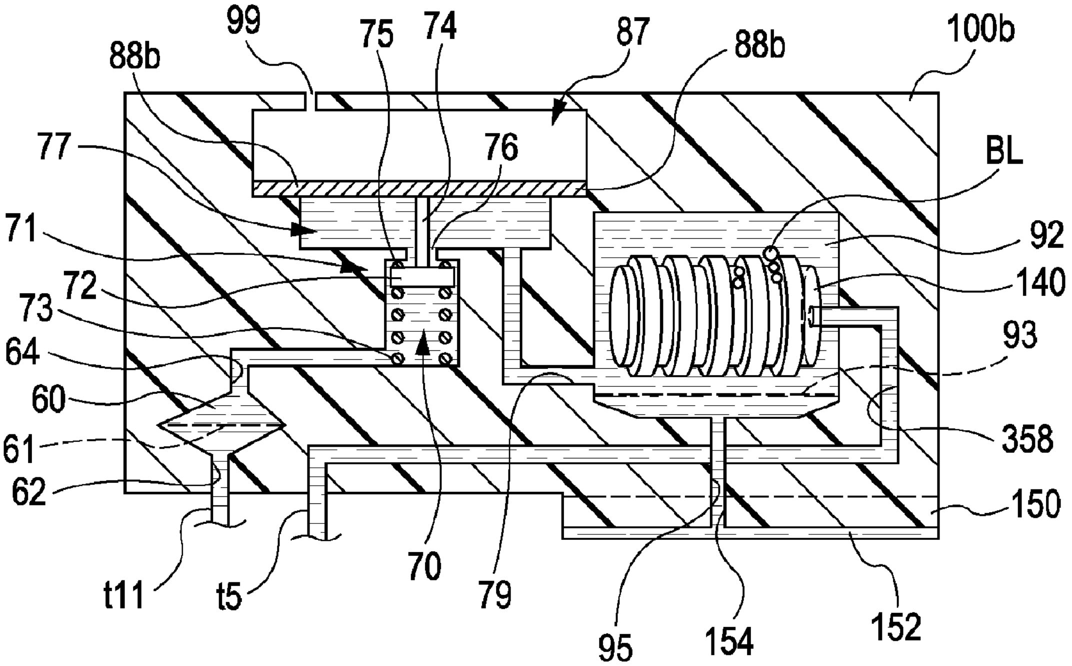
FIG. 18A is an explanatory diagram schematically showing the function of a carriage and a record head according to a tenth embodiment of the invention.

FIG. 18A is an explanatory diagram schematically showing the function of a carriage 100*b* and a record head 150 according to a tenth embodiment of the invention. FIG. 18A, similarly to FIG. 8B, shows the state of the carriage 100*b* and the record head 150 after the flow of the ink into a first compression chamber 77. The carriage 100*b* as a defoaming mechanism according to the tenth embodiment includes a decompression tube 140 instead of the second compression chamber 89, the second pressure-adjusting valve 81, and the decompression chamber 80, which is different from the carriage 100 (FIGS. 7 to 12), and other configurations and the sequence of manufacturing the carriage are the same as those according to the fifth embodiment.

According to the fifth embodiment, the chamber (the decompression chamber 80) to be decompressed is disposed to be adjacent to the defoaming chamber 92. However, according to the tenth embodiment, such a chamber (the decompression tube 140) is disposed inside the defoaming chamber 92.

Figure 18B:
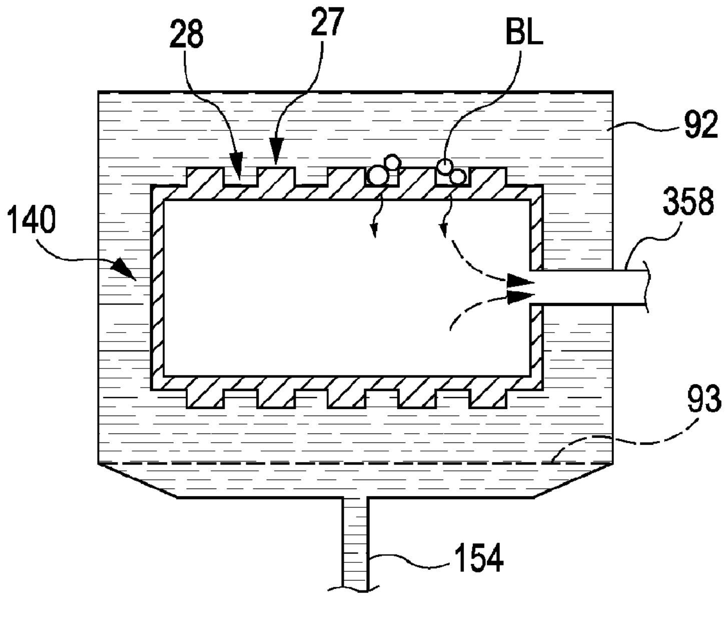
FIG. 18B is a cross-sectional view showing a detailed configuration of a decompression tube and a defoaming chamber.

FIG. 18B is a cross-sectional view showing a detailed configuration of the decompression tube 140 and the defoaming chamber 92 shown in FIG. 18A. The decompression tube 140 is disposed on the upper side of a filter 93 inside the defoaming chamber 92. In addition, the function of the decompression tube 140 is the same as that of the decompression chamber 80 according to the fifth embodiment. This decompression tube 140 has a cylindrical shape and is connected to a tube t5 through a negative-pressure supplying path 358. The walls of the decompression tube 140 have gas permeability. In addition, the inner wall of the decompression tube 140 is flat, and the outer wall of the decompression tube 140 has a concave-convex shape. Thus, the cross-section of the wall of the decompression tube 140, similar to the fifth embodiment, is formed in a rib shape. In particular, the outer wall of the decompression tube 140 has a shape in which a thick portion 27 and a thin portion 28 extending in the circumferential direction are alternately disposed. Thus, the cross-section of the decompression tube 140, similar to the fifth embodiment, has a rib shape, and the thickness of the thin portion 28 is configured to be smaller than that of the thick portion 27. In addition, the thicknesses of the thin portion 28 and the thick portion 27 may be configured to be the same as those of the concave portion 21 and the convex portion 22 according to the fifth embodiment. The decompression tube 140 corresponds to the decompression chamber according to an embodiment of the invention. In addition, the concave-convex shape of the outer wall of the decompression tube 140 corresponds to the reinforced shape according to an embodiment of the invention.

The carriage 100*b* according to the tenth embodiment having the above-described configuration has the same advantages as those according to the fifth embodiment. In addition, since the decompression tube 140 is disposed inside the defoaming chamber 92, the decompression chamber 80 or the air chamber 87 are not needed, and thereby the carriage 100*b* can be miniaturized.

K. Modified Examples

In addition, elements from among constituent elements, which have been described in each of the above-described embodiments, other than elements claimed in an independent claim are not essential elements and may be appropriately omitted. In addition, the invention is not limited to the above-described embodiments or examples and may be implemented in various forms within the scope of the invention without departing from the basic idea. For example, the following modifications can be made therein.

K1. Modified Example 1

In the above-described first to third embodiments, a portion that is used for defoaming together with the defoaming chamber 130 is the compression chamber 110. However, instead of the compression chamber 110, a different chamber may be used for defoaming. For example, in a configuration in which ink tanks for each color and sub tanks for each color that are connected to the ink tanks and are blocked (sealed) from the air outside are included instead of the ink cartridges IC1 to IC4, the sub tanks may be used for defoaming. There are cases where the sub tank is configured without using a flexible member. However, even in such cases, air bubbles may be generated or grown inside the sub tank due to a change in the temperature during the non-use of the printer or the like. Accordingly, by configuring the sub tank to be used for defoaming, the air bubbles can be eliminated from the ink supplying path, or the growth of the air bubbles can be suppressed. In addition, in such a configuration, the valve chamber 140 or the valve device 141 other than the compression chamber 110 may be omitted. In other words, generally, a configuration may be employed in which any arbitrary broaden chamber (a portion that has a cross-section area larger than that of the ink supplying path) is set to be used for defoaming in a liquid ejecting apparatus according to an embodiment of the invention.

K2. Modified Example 2

In the above-described embodiments, the decompression pump 300 is commonly used for all the colors (black, cyan, magenta, and yellow). However, instead of such a configuration, a configuration may be used in which the decompression pumps 300 are disposed for each color. In addition, the ink supply pumps 220*a* to 220*d* are prepared for each color in the above-described embodiments. However, instead of such a configuration, one ink supply pump may be configured to be commonly used for all the colors. In addition, the decompression pump 300 may be configured to be commonly used as one of (or all) the ink supply pumps 220*a* to 220*d*. When one pump is commonly used instead of the ink supply pumps 220*a* to 220*d*, the pump may be used also for decompressing the decompression chamber 105.

K3. Modified Example 3

In each of the above-described embodiments, as a configuration for supplying ink of each color from the ink cartridges IC1 to IC4 to the carriage 100, ink of each color is configured to be sucked from the ink cartridges IC1 to IC4 and ejected by using the ink supply pumps 220*a* to 220*d*. However, instead of such a configuration, a configuration may be used in which a compression pump is installed, and ink is delivered to the carriage 100 by supplying air, which is pressed by the compression pump, to the inside of the ink cartridges IC1 to IC4.

K4. Modified Example 4

In each of the above-described embodiments, the types of ink ejected by the printer come in four colors. However, instead of such a configuration, a configuration may be used in which ink of an arbitrary number of types is ejected. In addition, the printer according to each of the above-described embodiments is an off-carriage-type printer. However, instead of such a configuration, a so-called on-carriage-type printer in which the ink cartridge is mounted on the carriage may be used.

K5. Modified Example 5

In the above-described first and third embodiments, the faces of the decompression chamber 105 that are brought into contact with the compression chamber 110 and the defoaming chamber 130 are the top face (the ceiling face) and the bottom face (the lower face). In addition, in the second embodiment, the faces of the decompression chamber 105 that are brought into contact with the compression chamber 110 and the defoaming chamber 130 are the left face and the lower face (the bottom face). However, the invention is not limited thereto. Thus, a configuration may be employed in which any arbitrary faces of the decompression chamber 105 are brought into contact with the compression chamber 110 and the defoaming chamber 130. For example, a configuration may be employed in which the left face of the decompression chamber 105 is brought into contact with the compression chamber 110, and the right face of the decompression chamber 105 is brought into contact with the defoaming chamber 130. In such a configuration, the compression chamber 110, the decompression chamber 105, and the defoaming chamber 130 are disposed in one row. Accordingly, similarly to the first embodiment, an excessive increase in the total size of the carriage 100 can be suppressed.

L. Modified Examples

In addition, for example, the following modifications can be made.

L1. Modified Example 6

In the above-described fifth embodiment, the partition wall portion 90 is integrally formed between the decompression chamber 80 and the defoaming chamber 92. However, instead of such a configuration, it may be configured that the bottom face of the decompression chamber 80 and the ceiling face of the defoaming chamber 92 are formed as separate walls having gas permeability and are brought into contact with each other in the case where a plurality of plates is stacked. Even in such a configuration, by forming either the bottom face of the decompression chamber 80 or the ceiling face of the defoaming chamber 92 in the rib shape, the strength between the decompression chamber 80 and the defoaming chamber 92 can be improved. In addition, in the sixth to eighth embodiments, the above-described configuration may be employed. In other words, generally, any arbitrary configuration, in which at least one of the walls of the decompression chamber 80 that has gas permeability and is brought into contact with the defoaming chamber 92 and the wall of the defoaming chamber 92 that has gas permeability and is brought into contact with the decompression chamber 80 has a rib shape, may be employed in a defoaming mechanism according to an embodiment of the invention.

As described above, when the bottom face of the decompression chamber 80 and the ceiling face of the defoaming chamber 92 are formed as separate walls having gas permeability, the sequence of the manufacturing process of the carriage, for example, may be as follow. The molding pattern for the member of the defoaming chamber 92 and the molding pattern for the member of the decompression chamber 80 are prepared, and the member of the defoaming chamber 92 and the member of the decompression chamber 80 are formed by using the above-described molding patterns. At this moment, as the molding material, a molding material is used that enables the bottom face of the decompression chamber 80 and the ceiling face of the defoaming chamber 92 to have gas permeability. In addition, the molding patterns are used that allow at least one of the bottom face of the decompression chamber 80 and the ceiling face of the defoaming chamber 92 to be in the rib shape. Then, the molding material is allowed to flow into the molding patterns in a direction along the longitudinal direction of the rib shape. Next, the member of the decompression chamber 80 and the member of the defoaming chamber 92 are bonded together so as to bring the decompression chamber 80 and the defoaming chamber 92 into contact with each other through the bottom face of the decompression chamber 80 and the ceiling face of the defoaming chamber 92.

L2. Modified Example 7

In the above-described eighth embodiment, the thick portion 24 has the thin cylinder shape. However, instead of the shape, the thick portion 24 may be configured to have a thin quadrangular prism shape. In addition, the thick portions 24 are disposed so as to be aligned at predetermined intervals in the above-described embodiment. However, instead of such disposition, the thick portions 24 may be randomly disposed. In addition, the thin portions 23 may be disposed so as to be aligned at predetermined intervals or be randomly disposed, on the basis of the thick portions 24. In other words, generally, a dot shape in which the thick portions and the thin portions are scattered may be employed as the shape of the partition wall portion of the defoaming mechanism according to an embodiment of the invention.

In addition, in the above-described seventh embodiment, the concave portion and the convex portion that form the waveform shape in the cross-section of the partition wall portion 90*a* are shapes bent by 90 degrees. However, instead of such a shape, the concave portion and the convex portion may be in the R shape having no acute angle portion.

In addition, in the above-described fifth to eighth embodiments, the shape of the partition wall portion is the rib shape (the fifth and sixth embodiments), the waveform shape (the seventh embodiment), and the dot shape (the eighth embodiment). However, the invention is not limited to the above-described shapes. Thus, any arbitrary shape for improving the strength may be employed to the partition wall portion of the defoaming mechanism according to an embodiment of the invention. For example, a shape formed by disposing lattice-shaped thick portions on the basis of thin portions may be used. In addition, a shape that is acquired by combining the above-described shapes may be used. In particular, it may be configured that an upper half portion of the partition wall portion is formed in a rib shape, and a lower half portion of the partition wall portion is formed in a dot shape. In other words, generally, any arbitrary reinforced shape may be used as the shape of the partition wall portion according to an embodiment of the invention.

L3. Modified Example 8

In the above-described seventh embodiment, the planar shape of the partition wall portion 90*a* is the same as that of the fifth embodiment. However instead of such a planar shape, similarly to the sixth embodiment, a shape of which the longitudinal direction is the horizontal direction (the direction parallel to the Z axis) may be used. In addition, in the above-described sixth embodiment, the longitudinal direction (the direction parallel to the Z axis) of the rib shapes of the partition wall portions 91, 91*c*, 91*m*, and 91*y* is the direction perpendicular to the direction (the direction parallel to the X axis) of inflow of the ink. However, instead of such a direction, the direction that intersects the direction of inflow of the ink at an arbitrary angle may be used. In other words, generally, a configuration may be employed in which the longitudinal direction of the shape of the partition wall portion and the direction of inflow of the liquid in the defoaming chamber intersect with each other at an arbitrary angle in the defoaming mechanism according to an embodiment of the invention.

L4. Modified Example 9

In the above-described fifth embodiment, the gate position of the molding material during the molding of the partition wall plate 10 (FIG. 12: Step S110) is the center of the upper side L1 (FIG. 10) of the partition wall plate 10. However, instead of such a position, the gate position of the molding material may be set to a different position located on the upper side L1. Even in such a case, the direction in which the molding material flows is almost an +X direction and can be configured as the direction along the longitudinal direction of the rib shapes of the partition wall portions 90, 90*c*, 90*m*, and 90*y*. In addition, the gate position may be set on other sides L2 to L4 instead of the upper side L1. When the gate position is set on the right side L3 or the left side L4, by allowing a formation member to flow in from the upper side (for example, a position at the same height as that of the distribution holes 65 and 65*y*) of the right side L3 or the left side L4, the direction of flow of the molding material in a portion corresponding to the partition wall portions 90, 90*c*, 90*m*, and 90*y* inside the molding pattern can be set to almost an +X direction.

L5. Modified Example 10

In the above-described ninth embodiment, the decompression chamber is not disposed to be adjacent to the defoaming chamber 92. However, instead of such a configuration, similarly to the fifth embodiment, a configuration may be employed in which the decompression chamber 80 adjacent to the defoaming chamber 92 through the partition wall portion 90 is disposed. In such a case, the air bubbles captured in the defoaming chamber 92 can be eliminated, and accordingly, significantly more air bubbles can be eliminated, compared to a configuration in which a defoaming operation is performed only in the defoaming portion 64*a*. In addition, similarly to the sixth embodiment, a configuration may be employed in which the decompression chamber adjacent to the defoaming chamber 92 is disposed.

L6. Modified Example 11

In each of the above-described embodiments, the types of ink ejected by the printer 500 come in four colors. However, instead of such a configuration, a configuration may be used in which ink of an arbitrary number of types is ejected. In addition, the printer according to each of the above-described embodiments is an off-carriage-type printer. However, instead of such a configuration, a so-called on-carriage-type printer in which the ink cartridge is mounted on the carriage may be used.

L7. Modified Example 12

In each of the above-described embodiments, examples that are applied to the carriages 100, 100*a*, and 100*b* as the defoaming mechanism have been shown. However, instead of such a configuration, a defoaming mechanism may be configured separately from the carriage. For example, a defoaming mechanism may be configured by disposing the defoaming chamber and the decompression chamber in the middle of the tubes t11 to t14. Also in such a configuration, by configuring at least one of the walls of the defoaming chamber that has gas permeability and is brought into contact with the decompression chamber and the wall of the decompression chamber that has gas permeability and is brought into contact with the defoaming chamber in a reinforced shape, the strength of the defoaming mechanism can be improved.

L8. Modified Example 13

In the above-described ninth embodiment, the cross-section of the defoaming portion 64*a* has a waveform shape in which the concave portion 25 and the convex portion 26 are alternately disposed. However, instead of such a form, the cross-section of the defoaming portion 64*a* may be configured to have a rib shape as in the fifth and sixth embodiments or a dot shape as in the eighth embodiment. In addition, in the tenth embodiment, the cross-section of the wall of the decompression tube 140 has a rib shape. However, instead of such a shape, as in the seventh embodiment, the cross-section of the wall of the decompression tube 140 may have a waveform shape.

L9. Modified Example 14

In each of the above-described embodiments, an ink jet printer has been described. However, the invention is not limited thereto and may be applied to any arbitrary liquid ejecting apparatus that ejects a liquid other than the ink. For example, the invention may be applied to an image recording apparatus such as a facsimile; a coloring material ejecting head that is used for manufacturing a color filter of a liquid crystal display or the like; an electrode material ejecting apparatus that is used for forming the electrode of an organic EL (electroluminescence) display, an FED (field emission display), or the like; a liquid ejecting apparatus that ejects a liquid containing a bioorganic material that is used for manufacturing a bio chip; a test material ejecting apparatus as a precision pipette; a lubricant ejecting apparatus; a resin-solution ejecting apparatus; or the like. In addition, the invention may be applied to: a liquid ejecting apparatus that ejects a lubricant to a precision machine such as a clock or a camera in a pin-point manner; a liquid ejecting apparatus that ejects a transparent resin solution such as an ultraviolet-curable resin onto a substrate for forming a tiny hemispherical lens (optical lens) used in an optical communication element or the like; or a liquid ejecting apparatus that ejects an acid etching solution, alkali etching solution, or the like for etching a substrate or the like. Furthermore, the invention may be applied to any one of various liquid ejecting apparatuses that include a liquid ejecting head that eject tiny amount of liquid droplets or the like.

Here, the liquid droplet represents the shape of the liquid ejected from the liquid ejecting apparatus and includes the shape of a particle, a tear, or a lengthy string. In addition, the liquid described here represents a material that the liquid ejecting apparatus can eject. For example, the liquid may be a material in the liquid phase and includes a liquid state having high or low viscosity, a material in the fluid phase such as sol, gel water, other inorganic solvent, organic solvent, liquid solution, liquid resin, or liquid metal (metal melt). In addition, the liquid includes not only a liquid as one phase of a material but also a material in which particles of a function material formed of a solid material such as a pigment or a metal particle is dissolved, dispersed, or mixed as a solvent. As major examples of the liquid, there are ink and liquid crystal described in the embodiments above. Here, the ink includes general water-based ink, oil-based ink, and various types of liquid compositions such as gel ink or hot-melt ink.

What is claimed is:

1. A liquid ejecting apparatus that is used for ejecting a liquid, the liquid ejecting apparatus comprising:

a head unit that ejects the liquid;

a liquid supplying path that is used for leading the liquid to the head unit;

a defoaming chamber that is disposed in the liquid supplying path and is used for eliminating air bubbles inside the liquid;

a broaden chamber that is disposed in the liquid supplying path and can collect the liquid due to having a cross-section area larger than that of the liquid supplying path; and a decompression unit that is used for decompressing the defoaming chamber and the broaden chamber, wherein the decompression unit includes a decompression chamber, wherein the decompression chamber is brought into contact with the defoaming chamber and the broaden chamber, and wherein gas can permeate through the wall of the decompression chamber that is brought into contact with the defoaming chamber, the wall of the decompression chamber that is brought into contact with the broaden chamber, and the wall of the defoaming chamber that is brought into contact with the decompression chamber, and a wall of the broaden chamber that is brought into contact with the decompression chamber.

2. The liquid ejecting apparatus according to claim 1, wherein the decompression unit includes a pressure adjusting section that adjusts the pressure inside the decompression chamber.

3. The liquid ejecting apparatus according to claim 1 wherein the wall of the decompression chamber that is brought into contact with the defoaming chamber and the wall of the defoaming chamber that is brought into contact with the decompression chamber are integrally formed, and wherein the wall of the decompression chamber that is brought into contact with the broaden chamber and the wall of the broaden chamber that is brought into contact with the decompression chamber are integrally formed.

4. The liquid ejecting apparatus according to claim 1 wherein the defoaming chamber is disposed on the lower side of the decompression chamber, wherein the broaden chamber is disposed on the upper side of the decompression chamber, and wherein the defoaming chamber, the decompression chamber, and the broaden chamber are disposed in approximately one row in the vertical direction.

5. The liquid ejecting apparatus according to claim 4, wherein the defoaming chamber has an ejection opening for the liquid on a bottom face, and wherein the decompression chamber is disposed on the upper side of the ejection opening in the vertical direction.

6. The liquid ejecting apparatus according to claim 1, wherein the broaden chamber includes a flexible portion having flexibility and wherein the broaden chamber is brought into contact with the decompression chamber in a portion other than the flexible portion.

7. The liquid ejecting apparatus according to claim 6, further comprising:

a valve chamber that is linked with a liquid inflow opening of the broaden chamber; and a valve device that is disposed over the valve chamber and the broaden chamber, wherein the flexible portion is elastically deformed to the inside of the broaden chamber when the pressure inside the broaden chamber is lower than the external pressure of the broaden chamber, and wherein the valve device is in a valve opening state in which the liquid flows into the broaden chamber from the liquid inflow opening by using suppressed pressure during the elastic deformation of the flexible portion.

* * * * *